(12) United States Patent
Zeng

(10) Patent No.: US 10,498,869 B2
(45) Date of Patent: Dec. 3, 2019

(54) MOBILE TERMINAL AND ELECTRONIC DEVICE

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/214,429

(22) Filed: Dec. 10, 2018

(65) Prior Publication Data

US 2019/0124186 A1 Apr. 25, 2019

Related U.S. Application Data

(63) Continuation of application No. PCT/CN2018/108832, filed on Sep. 29, 2018.

(30) Foreign Application Priority Data

Oct. 24, 2017 (CN) .................... 2017 2 1389536 U
Feb. 9, 2018 (CN) .................... 2018 2 0234540 U

(51) Int. Cl.
*H04M 1/02* (2006.01)

(52) U.S. Cl.
CPC ................. *H04M 1/0235* (2013.01)

(58) Field of Classification Search
CPC .......... G06F 1/1626; G06F 2200/1634; G06F 1/1624; H04M 1/0214; H04M 1/0237; H04M 1/0235; H04M 1/0216; H04M 1/185
See application file for complete search history.

(56) References Cited

U.S. PATENT DOCUMENTS

| 2003/0078082 | A1 | 4/2003 | Su |
| 2009/0203398 | A1 | 8/2009 | Griffin |
| 2009/0212675 | A1* | 8/2009 | Zhang ................. H04M 1/0237 312/237 |

(Continued)

FOREIGN PATENT DOCUMENTS

| CN | 200987185 Y | 12/2007 |
| CN | 101907509 A | 12/2010 |

(Continued)

OTHER PUBLICATIONS

International search report,PCT/CN2018/108834, dated Jan. 2, 2019 (9 pages).

(Continued)

*Primary Examiner* — Nizar N Sivji

(57) ABSTRACT

A mobile terminal is disclosed. The mobile terminal includes a slidable assembly, a driving mechanism, a screen, and a back cover covering the screen. The slidable assembly includes a slider and at least one functional component fixed to the slider. The slider is retractable and slidable relative to the back cover in a direction substantially parallel to the screen, in order to drive the at least one functional component to be covered by the screen or exposed out of the screen. The driving mechanism is fixed between the screen and the back cover, and configured to drive the slider to slide.

20 Claims, 15 Drawing Sheets

(56) References Cited

U.S. PATENT DOCUMENTS

2009/0233660 A1    9/2009   Demuynck
2011/0157033 A1    6/2011   Rema Shanmugam et al.
2011/0249384 A1   10/2011   Warren et al.

FOREIGN PATENT DOCUMENTS

| CN | 105100312 A | 11/2015 |
|---|---|---|
| CN | 105897972 A | 8/2016 |
| CN | 106657456 A | 5/2017 |
| CN | 106713549 A | 5/2017 |
| EP | 1558007 A1 | 7/2005 |
| EP | 3163845 A1 | 5/2017 |
| EP | 3255867 A1 | 12/2017 |
| WO | WO2014182596 A1 | 11/2014 |

OTHER PUBLICATIONS

International search report, PCT/CN2018/108832, dated Dec. 29, 2018 (9 pages).
European search report, EP18210850, dated Feb. 4, 2019 (7 pages).
International Search Report dated Jan. 2, 2019; PCT/CN2018/108834.
International Search Report dated Dec. 29, 2018; PCT/CN2018/108832.
European Search Report dated May 31, 2019; Appln. No. 18210852.2.

* cited by examiner

MOBILE TERMINAL AND ELECTRONIC DEVICE

CROSS REFERENCE TO RELATED APPLICATIONS

The present disclosure is a continuation-application of International (PCT) Patent Application No. PCT/CN2018/108832 filed Sep. 29, 2018, which claims foreign priorities of Chinese Patent Application No. 201721389536.2, filed on Oct. 24, 2017, and Chinese Patent Application No. 201820234540.X, filed on Feb. 9, 2018, the entire contents of which are hereby incorporated by reference in their entireties.

TECHNICAL FIELD

The described embodiments relate to electronic devices, and in particular, to a mobile terminal and an electronic device.

BACKGROUND

At present, a front side of a mobile phone has a display area and a non-display area arranged adjacent to and side by side with the display area. The non-display area is provided with function components including such as a microphone, a front camera module, a button, and the like, which results in a reduction in the screen ratio of the screen of the mobile phone, and thus the user experience is poor.

SUMMARY

According to one aspect, a mobile terminal may be provided. The mobile terminal may include a screen, a back cover covering the screen, a slidable assembly, and a driving mechanism. The slidable assembly may include a slider, at least one functional component fixed to the slider, and a first cover. The slider may be retractable and slidable relative to the back cover in a direction substantially parallel to the screen, and switchable between a retraction state in which the slider is covered by the screen and an extension state in which the slider is exposed out of the screen. The first cover may be slidably coupled to the slider, covering the at least one functional component, and slidable along with the slider such that the first cover is covered by the screen or exposed out of the screen. When the first cover is exposed out of the screen, the first cover may be substantially flush with the screen. The driving mechanism may be fixed between the screen and the back cover, and configured to drive the slider to slide.

According to another aspect, a mobile terminal may be provided. The mobile terminal may include a screen, a back cover covering the screen, a middle frame, a slider, at least one functional component fixed to the slider, a first cover, and a driving mechanism. The middle frame may be fixedly connected between the screen and the back cover. The slider may be retractable and slidable relative to the back cover in a direction substantially parallel to the screen, and movable between a first position at which the slider is covered by the screen and a second position at which the slider is exposed out of the screen. The first cover may be slidably coupled to the slider, covering the at least one functional component, and slidable along with the slider such that the first cover is covered by the screen or exposed out of the screen. When the slider is at the first position, the first cover is covered by the screen, when the slider is at the second position, the first cover is exposed out of the screen, and substantially flush with the screen. The driving mechanism may be fixed between the screen and the back cover, and configured to drive the slider to slide.

According to a further aspect, an electronic device may be provided. The electronic device may include a screen having a display area, a back cover covering the screen, a slider, at least one functional component fixed to the slider, a first cover, and a driving mechanism. The slider may be retractable and slidable relative to the back cover in a direction substantially parallel to the screen, and switchable between a retraction state in which the slider is covered by the screen and an extension state in which the slider is exposed out of the screen. When the slider slides to be covered by the screen, the display area at least partially covers the at least one functional component. The first cover may be slidably coupled to the slider, covering the at least one functional component, and slidable along with the slider such that the first cover is covered by the screen or exposed out of the screen. When the first cover is exposed out of the screen, the first cover is substantially flush with the screen. The driving mechanism may be fixed between the screen and the back cover, and configured to drive the slider to slide.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description are merely some embodiments of the present disclosure, for those skilled in the art, other drawings can be obtained based on these drawings without creative efforts.

DETAILED DESCRIPTION

Figure 1:
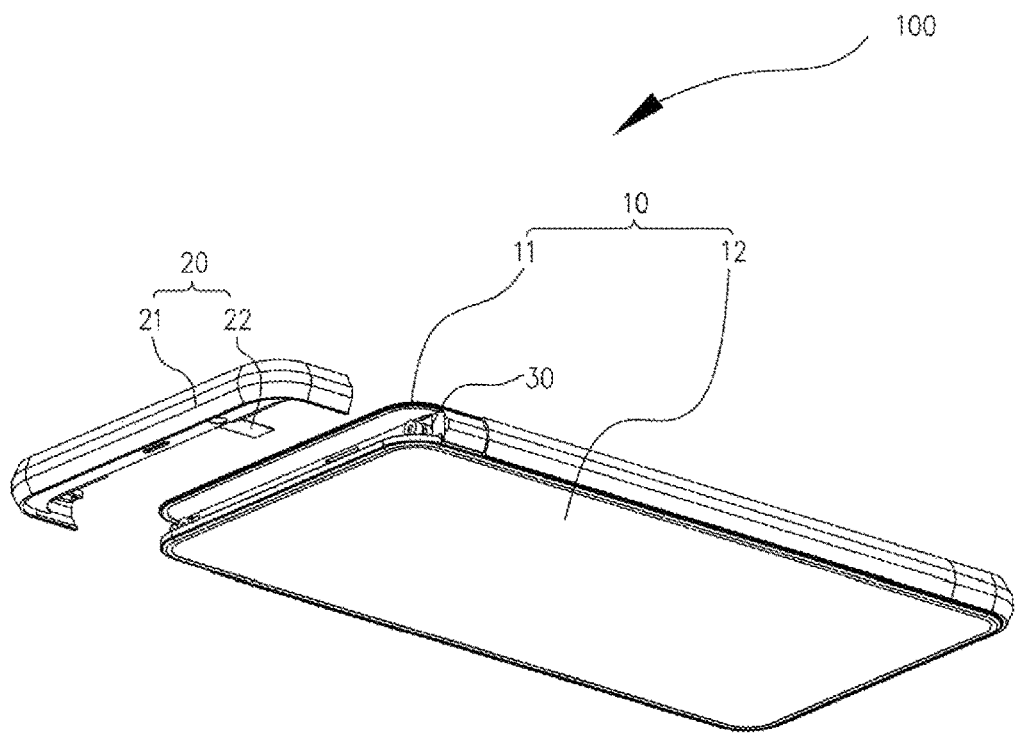
FIG. 1 is an exploded view of a mobile terminal according to an embodiment of the present disclosure.

The technical solutions in the embodiments of the present disclosure will be clearly and completely described in detail below with reference to the accompanying drawings in the embodiments of the present disclosure. Apparently, the embodiments described herein are only some exemplary embodiments, not all the embodiments. Based on the embodiments described in the present disclosure, one skilled in the art may acquire all other embodiments without any creative efforts. All these shall be covered within the protection scope of the present disclosure.

Terms such as "first", "second", "third", and the like are used herein for purposes of description, and are not intended to indicate or imply relative importance or significance or to imply the number of indicated technical features. Thus, features defined with "first", "second" and "third" may explicitly or implicitly include at least one of the features. In the description of the present disclosure, "a plurality of" means two or more, such as two, three, and the like, unless specified otherwise. All directional indications (such as up, down, left, right, front, back, and the like) in some embodiments of the present disclosure are only used to explain the relative positional relationship between components in a certain state (as shown in the figures), the movement situation, and the like; if the specific state changes, the directional indication also changes accordingly. Moreover, the terms "comprise", "include" or any other variations thereof are meant to cover non-exclusive including. For example, processes, methods, systems, articles or devices comprising a series of steps or elements do not only include those steps or elements, but also include other steps or elements that are not explicitly listed or also include the inherent steps or elements of the processes, methods, systems, articles or devices.

The term "embodiment" in the present disclosure indicates the specific features, structures, or characteristics may be included in at least one embodiment of the present disclosure. The terms appearing in different in various positions of the specification may not indicate the same embodiment, and may not indicate that the embodiment is independent from, alternative, or exclusive from other embodiments. Those skilled in the art may explicitly or implicitly understand that, the embodiment of the present disclosure may be combined with other embodiments.

In the description of the embodiments of the present disclosure, it should be understood that, the orientation or positional relationship indicated by the term "thickness" and the like is based on the orientation or positional relationship shown in the drawings, and is merely for convenience of description and for simplifying description, rather than implying or indicating that the device or the component must have a particular orientation or constructed and operated in a particular orientation, and thus these terms cannot to be construed as limiting the present disclosure.

According to one aspect, a mobile terminal may be provided. The mobile terminal may include a screen, a back cover covering the screen, a slidable assembly, and a driving mechanism. The slidable assembly may include a slider, at least one functional component fixed to the slider, and a first cover. The slider may be retractable and slidable relative to the back cover in a direction substantially parallel to the screen, and switchable between a retraction state in which the slider is covered by the screen and an extension state in which the slider is exposed out of the screen. The first cover may be slidably coupled to the slider, covering the at least one functional component, and slidable along with the slider such that the first cover is covered by the screen or exposed out of the screen. When the first cover is exposed out of the screen, the first cover may be substantially flush with the screen. The driving mechanism may be fixed between the screen and the back cover, and configured to drive the slider to slide.

In some embodiments, the driving mechanism may include a rotation shaft rotatably coupled to the back cover; a lengthwise direction of the rotation shaft may be substantially parallel to a sliding direction of the slider. A first guiding groove extending in a spiral curve may be defined on a peripheral wall of the rotation shaft, and a protrusion slidably coupled to the first guiding groove may be arranged on the slider. The protrusion may be slidable along the first guiding groove to drive the slider to slide relative to the back cover.

In some embodiments, a second guiding groove communicating with the first guiding groove may be defined on the peripheral wall of the rotation shaft at one end of the rotation shaft that is close to the slider in a peripheral direction of the rotation shaft, and the second guiding groove may have an unclosed configuration. The protrusion may be slidable along the second guiding groove.

In some embodiments, the back cover may include a middle frame fixedly connected to the screen. The middle frame may include a pair of first arms opposite to each other, each of the pair of first arms may define a sliding groove extending along a lengthwise direction of the pair of first arms. The slider may include a first outer frame, and the first outer frame may be slidable relative to the sliding groove. The at least one functional component may be fixed in a space defined by the first outer frame and the middle frame.

In some embodiments, the back cover may further include a pair of outer side plates opposite to each other. The pair of outer side plates may be fixedly connected to the middle frame and cover the pair of first arms.

In some embodiments, the first outer frame may include a pair of first splicing plates opposite to each other and a first side plate fixedly connected between the pair of first splicing plates. The sliding groove may be defined at one end of each of the pair of first arms, and each of the pair of first splicing plates may be slidable in the sliding groove. When the slider is in the retraction state, each of the pair of first splicing plates may cover the sliding groove, and may be spliced with each of the pair of outer side plates.

In some embodiments, the middle frame may further include a second arm connected between the pair of first arms, and a length of the second arm may be less than or equal to a length of each of the pair of first arms. The second arm may be arranged close to the slider, and the rotation shaft may pass through the second arm. The back cover may further include a second outer frame. The middle frame may further include a third arm fixedly connected between the pair of first arms, and the third arm may be disposed opposite to the second arm. A length of the third arm may be less than or equal to the length of the second arm. The second outer frame may be detachably connected to the pair of first arms and fixedly connected to the third arm.

In some embodiments, the second outer frame may include a pair of second splicing plates opposite to each other, and a second side plate fixedly connected between the pair of second splicing plates. The pair of second splicing plates may be detachably connected to the pair of first arms, and spliced with the pair of outer side plates; the second side plate covers the third arm.

In some embodiments, the slidable assembly may further include a second cover opposite the first cover. The second cover may be substantially parallel to the first cover, and the at least one functional component may be fixed between the first cover and the second cover. The second cover may be slidably coupled to the slider, and a sliding direction of the second cover may be substantially parallel to a normal direction of the screen.

In some embodiments, the back cover may include a back plate opposite to the screen. The driving mechanism may be fixed between the screen and the back plate, and the second cover may be covered by the back plate or exposed out of the back plate along with the slider. When the second cover is exposed out of the back plate, the second cover may slide to be substantially flush with the back plate.

In some embodiments, the slidable assembly may further include a locking assembly. The locking assembly may include a first locking member fixedly connected to the first cover and a second locking member fixedly connected to the second cover. The first locking member and the second locking member may exert a traction force to each other to drive the first cover and the second cover to move towards each other.

In some embodiments, the mobile terminal may further include a transmission mechanism coupled to the first cover and the driving mechanism. The transmission mechanism may be configured to drive the first cover to move relative to the slider. The transmission mechanism may include a first adapting shaft, and an axial direction of the first adapting shaft may be substantially parallel to a sliding direction of the slider. The first rotation shaft may be slidably coupled to the driving mechanism and rotatable when driven by the driving mechanism.

In some embodiments, the transmission mechanism may further include a second adapting shaft and a push rod. The second adapting shaft may be coupled to the first adapting shaft. The second adapting shaft may define a third guiding groove on a peripheral wall of the second adapting shaft and the third guiding groove may extend along a spiral curve. A sliding block may be arranged on the pushing rod and slidably coupled to the third guiding groove. The pushing rod may be slidable relative to the slider along an axis direction of the second adapting shaft to drive to the first cover to slide.

In some embodiments, the third guiding groove may extend in a non-equidistant spiral curve.

In some embodiments, the axial direction of the second adapting shaft may be substantially parallel to the first cover. A first wedge block may be arranged on the first cover, and a push block cooperating with the first wedge block may be arranged at one end of the push rod.

In some embodiments, the screen may have a display area. When the slider slides to be covered by the screen, the display area may at least partially cover the at least one functional component.

According to another aspect, a mobile terminal may be provided. The mobile terminal may include a screen, a back cover covering the screen, a middle frame, a slider, at least one functional component fixed to the slider, a first cover, and a driving mechanism. The middle frame may be fixedly connected between the screen and the back cover. The slider may be retractable and slidable relative to the back cover in a direction substantially parallel to the screen, and movable between a first position at which the slider is covered by the screen and a second position at which the slider is exposed out of the screen. The first cover may be slidably coupled to the slider, covering the at least one functional component, and slidable along with the slider such that the first cover is covered by the screen or exposed out of the screen. When the slider is at the first position, the first cover is covered by the screen, when the slider is at the second position, the first cover is exposed out of the screen, and substantially flush with the screen. The driving mechanism may be fixed between the screen and the back cover, and configured to drive the slider to slide.

According to a further aspect, an electronic device may be provided. The electronic device may include a screen having a display area, a back cover covering the screen, a slider, at least one functional component fixed to the slider, a first cover, and a driving mechanism. The slider may be retractable and slidable relative to the back cover in a direction substantially parallel to the screen, and switchable between a retraction state in which the slider is covered by the screen and an extension state in which the slider is exposed out of the screen. When the slider slides to be covered by the screen, the display area at least partially covers the at least one functional component. The first cover may be slidably coupled to the slider, covering the at least one functional component, and slidable along with the slider such that the first cover is covered by the screen or exposed out of the screen. When the first cover is exposed out of the screen, the first cover is substantially flush with the screen. The driving mechanism may be fixed between the screen and the back cover, and configured to drive the slider to slide.

Figure 2:
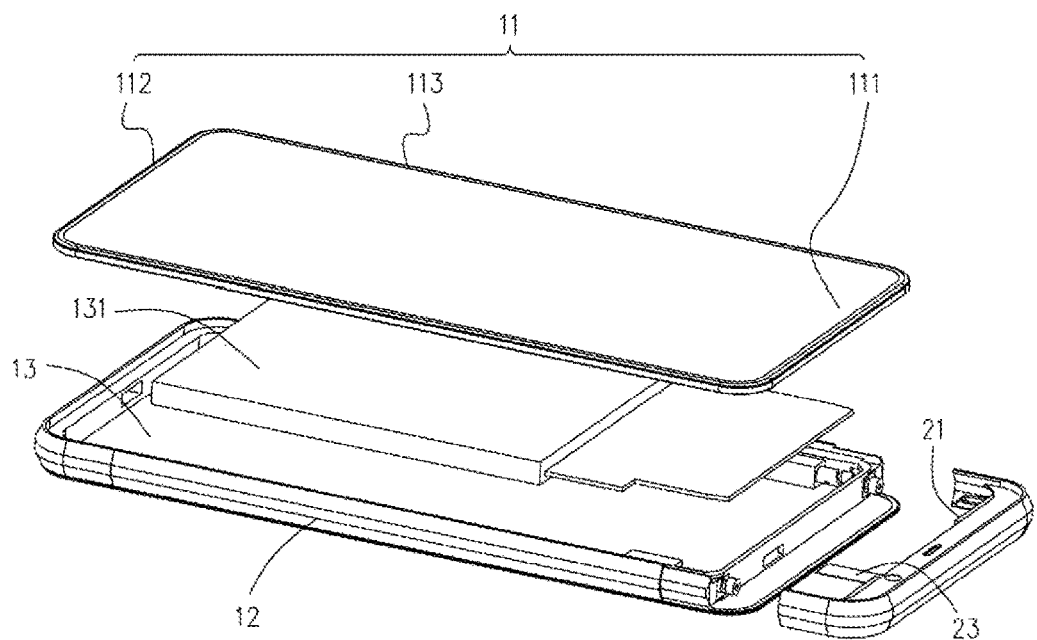
FIG. 2 is another exploded view of the mobile terminal according to an embodiment of the present disclosure.

FIG. 1 and FIG. 2 illustrates a mobile terminal 100. The mobile terminal 100 may be a mobile phone, a tablet, a laptop, and the like. Referring to FIGS. 1-2, the mobile terminal 100 may include a terminal body 10, a slidable assembly 20, and a driving mechanism 30. The terminal body 10 may include a screen 11 and a back cover 12 that is covered by the screen 11. The slidable assembly 20 may include a slider 21 and at least one functional component 22 fixed to the slider 21. In this embodiment, the slider 21 may be retractable and slidable relative to the back cover 12 in a direction substantially parallel to the screen 11. The slider 21 may be switchable between a retraction state and an extension state relative to the screen 11, in order to drive the at least one functional component 22 to be covered by the screen 11 (when the slider 21 is in the retraction state) or exposed out of the screen 11 (when the slider 21 is in the extension state). The driving mechanism 30 may be fixed between the screen 11 and the back cover 12, and configured to drive the slider 21 to slide.

It can be understood that, the at least one functional component 22 is covered by the screen 11 along with the slider 21 means that, the slider 21 slides to be received in a space defined by the screen 11 and the back cover 12, and the at least one functional component 22 is covered by the screen 11 (that is, the at least one functional component 22 cannot be seen from the outside of the mobile terminal 100). In this way, it is convenient for a user to carry the mobile terminal 100, a screen ratio of the screen 11 may be increased, and the user experience may be improved. The at least one functional component 22 is exposed out of the screen 11 along with the slider 21 means that, the slider 21 and the at least one functional component 22 are exposed out of the mobile terminal from one side of the screen 11, and thus it is convenient to perform corresponding functions of the at least one functional component 22.

Therefore, in some embodiments of the present disclosure, the driving mechanism 30 is fixed to the back cover 12, and the driving mechanism 30 may drive the slider 21 to slide relative to the screen 11, thereby driving the at least one functional component 22 on the slider 21 to slide relative to the screen 11. In this way, the at least one functional component 22 may be covered by the screen 11 or exposed out of the screen 11 along with the slider 21. When it is required to use the at least one functional component 22, the at least one functional component 22 may be exposed out of the screen 11. However, when the user needs to carry or does not want to use the at least one functional component, the at least one functional component 22 may be covered by the screen 11. Therefore, it does not needs to set a non-display area on the screen 11 to arrange the at least one function device 22, which may reduce the proportion of the non-display area, effectively increase the screen ratio of the screen, and improve the user experience.

The screen 11 may be a liquid crystal display (LCD) or an organic light-emitting diode (OLED). Referring to FIG. 3, FIG. 4, FIG. 5 and FIG. 6, in some embodiments, the screen 11 may be a full screen. The screen 11 may be substantially in shape of a rectangle. The screen 11 may include a first edge 111, a second edge 112 opposite to the first edge 111, and a pair of third edges 113 opposite to each other and connected between the first edge 111 and the second edge 112. In this case, the first edge 111 may be disposed adjacent to the slider 21, and both lengths respectively of the first edge 111 and the second edge 112 may be less than or equal to a length of the third edge 113. In this case, the screen 11 may include a display area. When the slider is slid to be covered by the screen 11, the display area at least partially covers the at least one functional component 22. In some embodiments, a very narrow non-display area may be provided adjacent to the first edge 111 and the second edge 112. The non-display area may be configured only to set a driving cable of the screen 11, in order to display images on the screen 11. Of course, in other embodiments, the screen 11 may not be provided with the non-display area.

Figure 3:
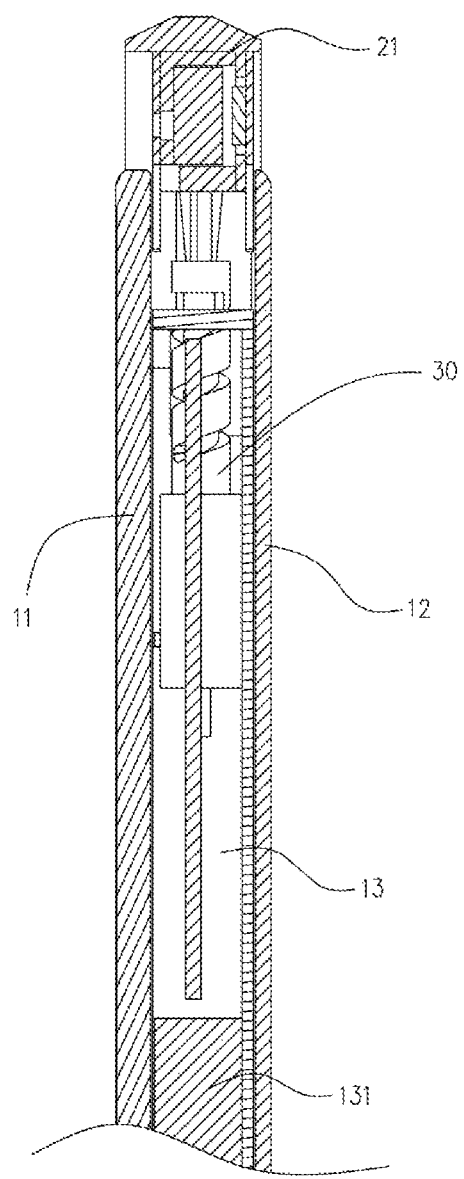
FIG. 3 is a sectional view of the mobile terminal according to an embodiment of the present disclosure.
Figure 4:
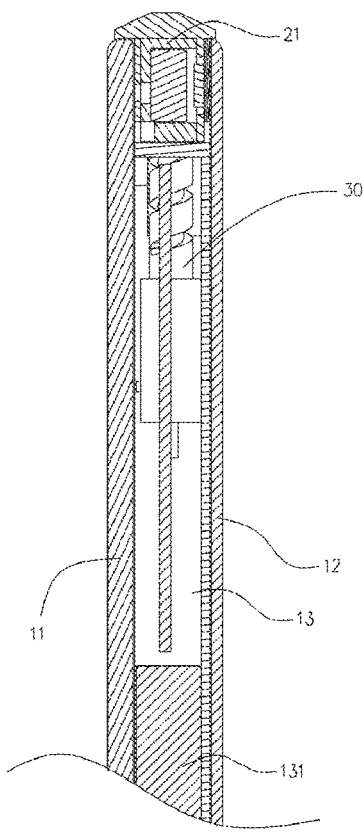
FIG. 4 is another sectional view of the mobile terminal according to an embodiment of the present disclosure.
Figure 5:
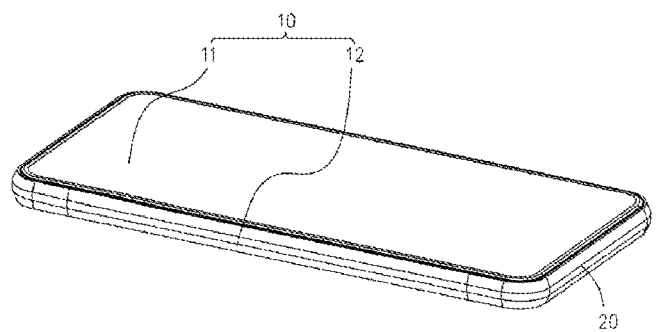
FIG. 5 is a perspective view of the mobile terminal according to an embodiment of the present disclosure; wherein the mobile terminal is in the retraction state.
Figure 6:
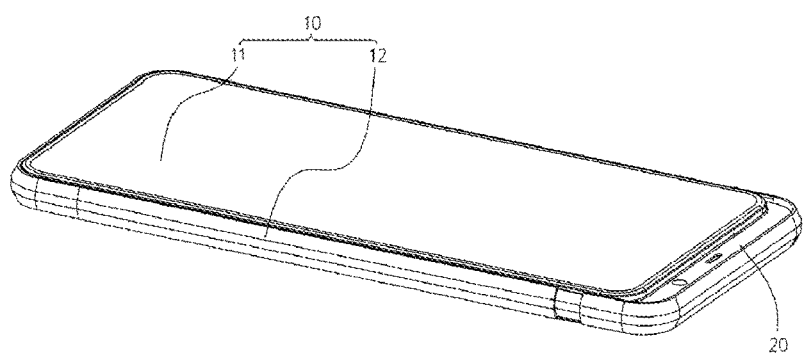
FIG. 6 is a perspective view of the mobile terminal according to an embodiment of the present disclosure; wherein the mobile terminal is in the extension state.

In this embodiment, the back cover 12 may have a shape substantially the same as that of the screen 11. Referring to FIGS. 3-4, a receiving chamber 13 may be defined by the back cover 12 and the screen 11. The driving mechanism 30 may be fixed in the receiving chamber 13, and thus the driving mechanism 30 may be protected. Referring to FIG. 5, when the slider 21 slides to be in the retraction state relative to the back cover 12, the at least one functional component 22 may slide into the receiving chamber 13 along with the slider 21, thereby hiding the at least one functional component 22. In this way, it is possible to reduce the proportion of the non-display area on one side of the mobile terminal that faces towards the user, and effectively increase the screen ratio of the display area. Referring to FIG. 6, when the slider 21 slides to be in the extension state relative to the back cover 12, the at least one functional component 22 may slide out of the receiving chamber 13 along with the slider 21. In this way, it is convenient for the at least one functional component 22 to provide a function signal to perform the corresponding functions of the at least one functional component 22.

Referring to FIG. 2, in some embodiments, the terminal body 10 may further include a control assembly 131. The control assembly 131 may be fixed and received in the receiving chamber 13, and electrically connected to the screen 11. The control device 131 may be configured to provide electrical signals and control signals to the screen 11. The control assembly 131 may include a battery, a central processing unit, and a main board.

Referring further to FIGS. 5-6, in this embodiment, the slider 21 may be slidable between the screen 11 and the back cover 12. An opening may be defined between the screen 11 and the back cover 12, and the opening may be disposed adjacent to the slider 21. When the slider 21 slides to be in the retraction state, the slider 21 may cover the opening, thereby preventing impurities from entering the receiving chamber 13, and improving the safety of the mobile terminal 100. In this embodiment, the slider 21 may be slidable relative to the screen 11 in a direction parallel to the third edge 113. Of course, in other embodiments, the slider 21 may also be slidable relative to the screen 11 in a direction parallel to the first edge 111.

In this embodiment, the at least one functional component 22 may include at least one functional component selected from the group consisting of a camera module, an iris recognition module, a face recognition module, a flash, a microphone, a receiver, a photoreceptor, a fingerprint module, and a button. The at least one functional component 22 may be fixed to the slider 21 and spaced apart from each other on the slider 21. When the at least one functional component 22 slides with the slider 21 to be in the retraction state, the at least one functional component 22 may be hidden at one side of the screen 11 that is away from the user, such that the at least one functional component 22 may be hidden by the screen 11. As a result, the user cannot see the at least one functional component 22, thereby making the appearance of the mobile terminal 100 concise, and thus the screen ratio of the display area may be increased. When the at least one functional component 22 slides with the slider 21 to be in the extension state, the at least one functional component 22 may be exposed out from the back of the screen 11, and may be arranged side-by-side with the screen 11, such that the at least one functional component 22 and the screen 11 may be arranged at the same side of the mobile terminal for user interaction. In this way, it is convenient for the user to use the mobile terminal 100, and thus the user experience may be improved.

Figure 7:
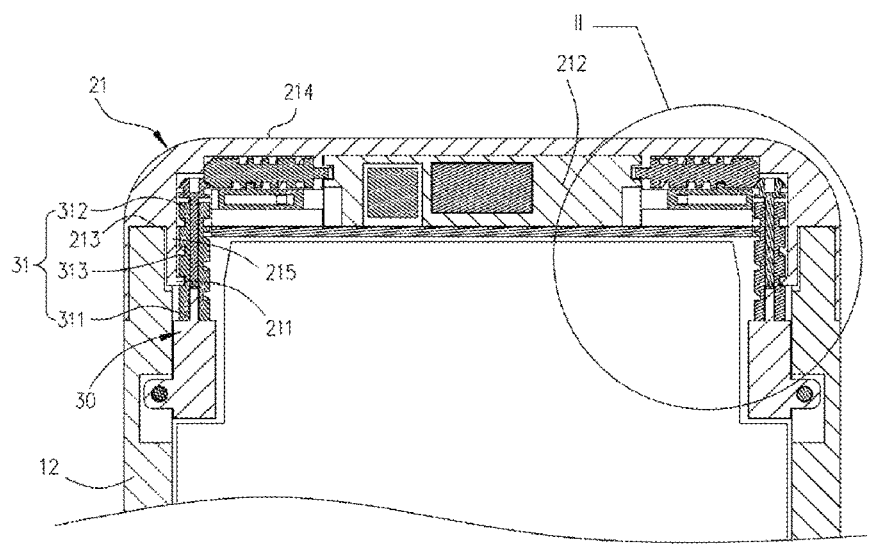
FIG. 7 is a partially sectional view of the mobile terminal according to an embodiment of the present disclosure.

Further, referring to FIG. 7, in some embodiments, the driving mechanism 30 may substantially include a rotation shaft 31 rotatably coupled to the back cover 12. A lengthwise direction of the rotation shaft 31 may be substantially parallel to a sliding direction of the slider 21. A first guiding groove 311 extending in a spiral curve may be defined on a peripheral wall of the rotation shaft 31. A protrusion 211 slidably coupled to the first guiding groove 311 may be arranged on the slider 21. The protrusion 211 may be slidable along the first guiding groove 311 to drive the slider 21 to slide relative to the back cover 12. In some embodiments, the first guiding groove 311 may extend in an equidistant spiral curve. When the rotation shaft 31 rotates at a constant speed relative to the back cover 12, since the first guiding groove 311 extends along the spiral curve, the protrusion 211 may slide at a constant speed relative to the first guiding groove 311, and drive the slider 21 to rotate at a constant speed relative to the back cover 12 in a direction substantially parallel to an axial direction of the rotation shaft 31.

As shown in FIG. 7, in this embodiment, the driving mechanism 30 may include two rotation shafts 31, and the two rotation shafts 31 are respectively fixed to the back cover 12 at a position close to the pair of third edges 113. Of course, in other embodiments, the driving mechanism 30 may also include only one rotation shaft 31. The number of the rotation shafts 31 may not be limited herein.

Further, as shown in FIG. 7, in this embodiment, the rotation shaft 31 may include a first rotating end 312 and a second rotating end 313 opposite to the first rotating end 312. The first rotating end 312 may be disposed close to the slider 21. The second rotating end 313 may be rotatably coupled to the back cover 12.

Figure 8:
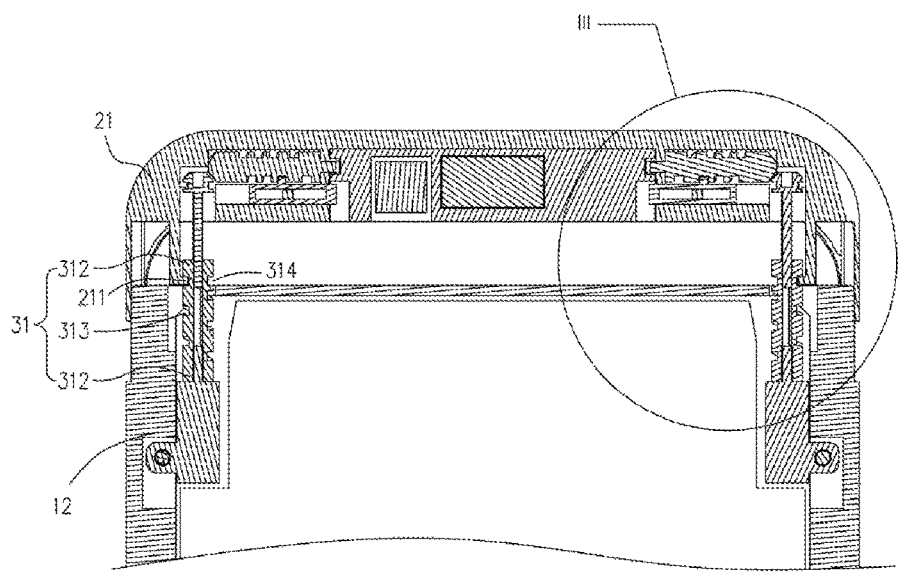
FIG. 8 is a partially sectional view of the mobile terminal according to an embodiment of the present disclosure; wherein the mobile terminal is in another state.

Further, referring to FIG. 7 and FIG. 8, a second guiding groove 314 communicating with the first guiding groove 311 may be defined on the peripheral wall at one end of the rotation shaft 31 that is close to the slider 21, and the second guiding groove 314 may extend in the peripheral direction of the rotation shaft.

More specifically, in some embodiments, the second guiding groove 314 may be located at the first rotating end 312. The second guiding groove 314 may have an unclosed configuration, that is, the second guiding groove 314 may surround the peripheral wall of the rotation shaft 31 at an angle of less than 360° peripheralrotation shaft. That is to say, the protrusion 211 may rotate a preset angle in the second guiding groove 314 relative to an axis of the rotation shaft 31, and the preset angle is less than 360°. By designing the second guiding groove 314 to surround the peripheral wall of the rotation shaft 31 at an angle of less than 360° peripheralrotation shaft, the protrusion 211 may smoothly and successfully retract back into the first guiding groove 311. When the protrusion 211 slides into the second guiding groove 314, the second guiding groove 314 may provide a limitation to the protrusion 211, such that the protrusion 211 will no longer move relative to the back cover 12 in the axis direction of the rotation shaft 31. That is, the slider 21 will no longer slide relative to the back cover 12. However, the rotation shaft 31 may still rotate relative to the back cover 12, and may be capable of providing torque to other components, in order to continue to drive the other components to move. Therefore, the driving mechanism 30 has a simple structure.

Referring to FIG. 7, in this embodiment, the slider 21 may include a holder 212. The holder 212 may include a bottom wall 213 facing towards the receiving chamber 13 and a top wall 214 opposite to the bottom wall 213. When the slider 21 slides to a position covering the opening, the bottom wall 213 may be sandwiched between the screen 11 and the back cover 12, and covered by the screen 11 and the back cover 12. At this time, the bottom wall 213 may be substantially perpendicular to the screen 11, while the top wall 214 may be substantially flush with the first edge 111 of the screen 11.

The slider 21 may also include a connecting bar 215. The connecting bar 215 may extend from the bottom wall 213 in a direction substantially parallel to the rotation shaft 31. The protrusion 211 may be disposed at one end of the connecting bar 215 that is away from the bottom wall 213. In this embodiment, a pair of connecting bars 215 may be arranged on the holder 212 at the position that is close to the pair of third edges 113. The protrusions 211 on the pair of connecting bars 215 are correspondingly and slidably coupled to the first guiding groove 311 and the second guiding groove 314 of each rotation shaft 31. In this embodiment, the pair of connecting bars 215 are respectively close to the pair of third edges 113, such that the pair of connecting bars 215 may stably and effectively drive the slider 21 to slide.

Figure 9:
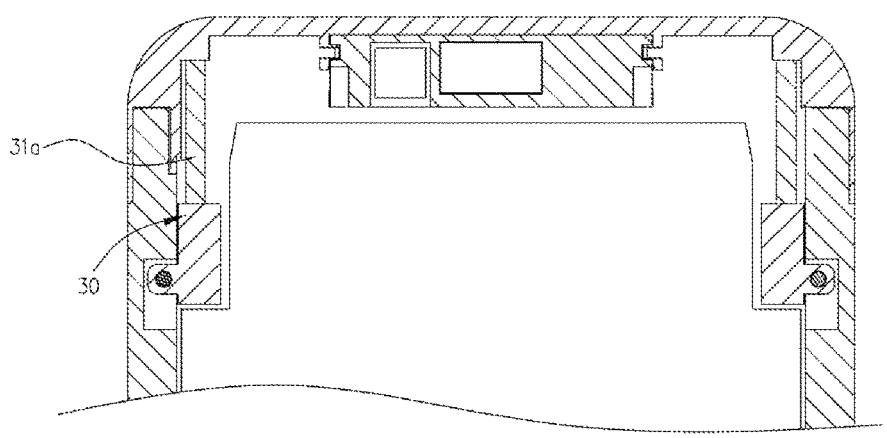
FIG. 9 is a partially sectional view of the mobile terminal according to another embodiment of the present disclosure.

In the embodiments described above, the slider 21 is driven to slide by using the rotation shaft. However, in other embodiments, the slider 21 may be driven to slide by means of other components. For example, in the embodiment shown in FIG. 9, the driving mechanism 30 may include a retractable rod 31a. One end of the retractable rod 31a may be fixedly connected to the back cover 12, and the other end of the retractable rod 31a may be fixedly connected to the slider 21. The slider 21 may slide relative to the back cover 12 by the retraction or extension of the retractable rod 31a.

Figure 10:
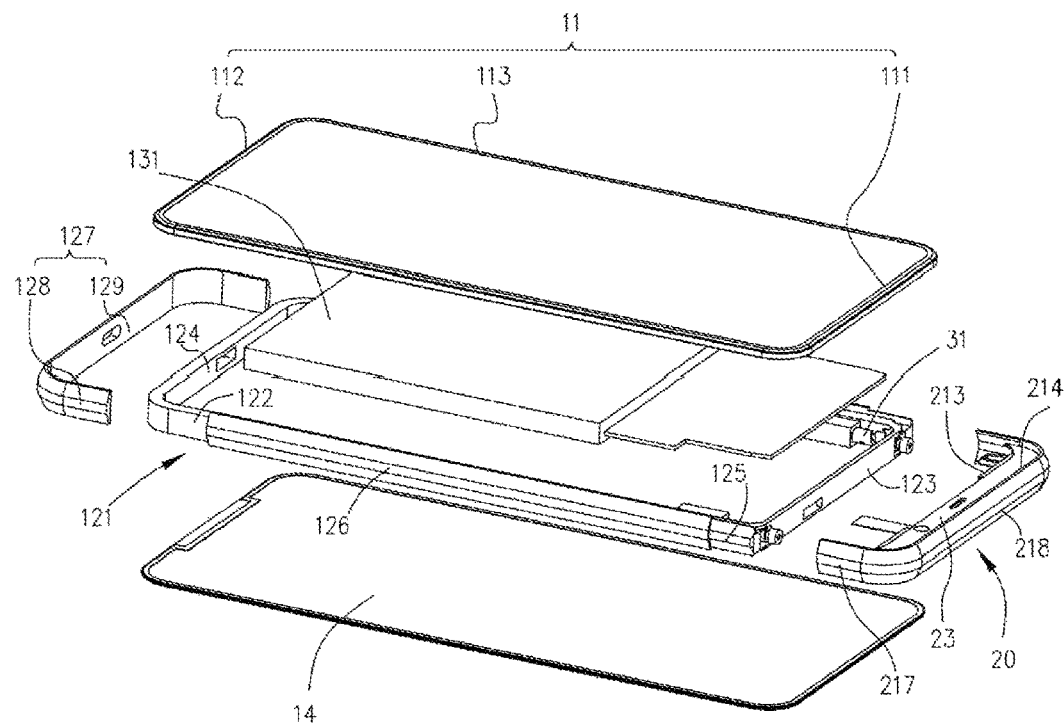
FIG. 10 is an exploded view of a mobile terminal according to an embodiment of the present disclosure.
Figure 11:
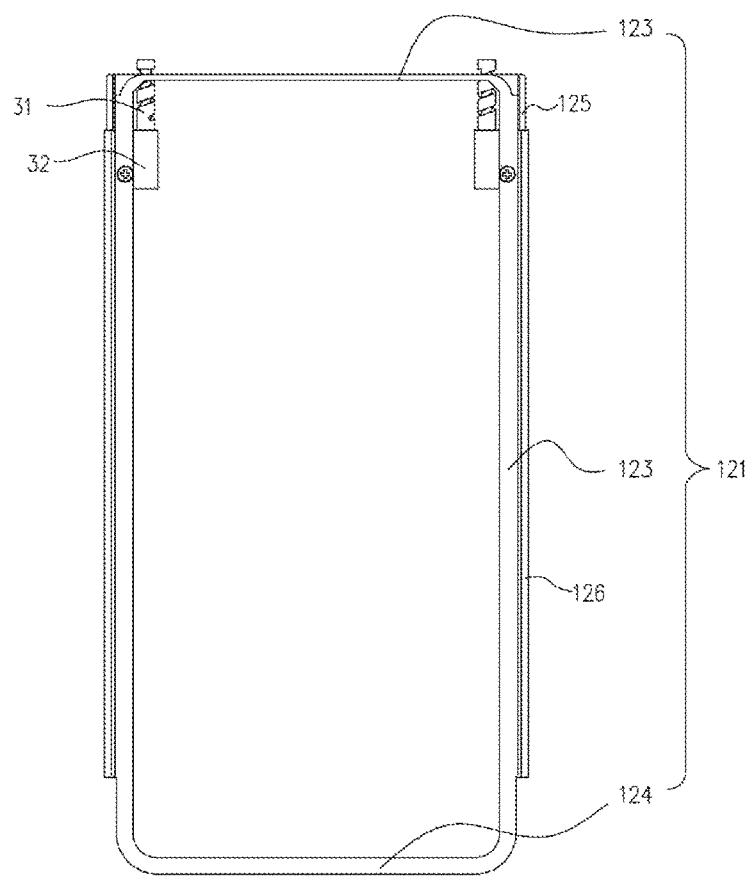
FIG. 11 is a schematic structural view of a middle frame of the mobile terminal according to an embodiment of the present disclosure.
Figure 12:
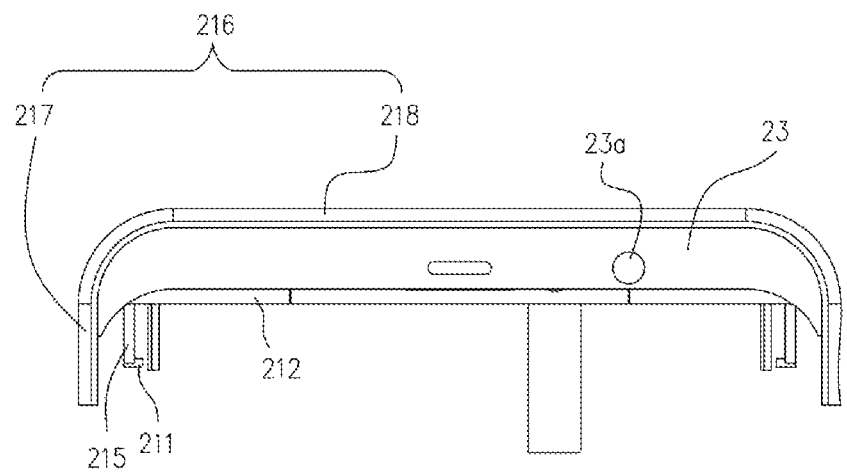
FIG. 12 is a schematic view of a slidable assembly of the mobile terminal according to an embodiment of the present disclosure.

Further, referring to FIG. 10, FIG. 11 and FIG. 12, in this embodiment, the back cover 12 may include a middle frame 121 fixedly connected to the screen 11. In this embodiment, the middle frame 121 may be substantially in shape of a rectangle. The middle frame 121 may include a pair of first arms 122 opposite to each other, and a second arm 123 and a third arm 124 fixedly connected to the pair of first arms 122 and opposite to each other. In this case, a length of the second arm 123 and that of the third arm 124 may be both less than or equal to a length of each of the pair of first arms 122. The first arm 122 may be fixedly connected to the third edge 113 of the screen 11. The second arm 123 may be fixedly connected to one side of the screen 11 that is away from the user, and may be adjacent to the first edge 111. The third arm 124 may be fixedly connected to the second edge 112 of the screen 11.

The driving mechanism 30 may also include a motor 32 fixedly connected to an inner side of the middle frame 121. The middle frame 121 may firmly carry the motor 32, and provide a protection to the motor 32. In this embodiment, as shown in FIGS. 10-12, the motor 32 may be fixedly coupled to an inner side of each first arm 122 (that is, the motor 32 is located between the pair of first arms 122, or located at one side of one first arm 122 that faces towards the other first arm 122) by means of, for example, a screw, and may be close to the second arm 123. The first rotating end 312 of the rotation shaft 31 may be rotatably coupled to the motor 32. A head end (not labeled) of the rotation shaft 31 may pass through the second arm 123, and a bearing may be provided for the rotation shaft 31 via the second arm 123. When the motor 32 drives the rotation shaft 31 to rotate in a preset direction, the protrusion 211 may slide relative to the back cover 12 from the first rotating end 312 to the second rotating end 313 along the first guiding groove 311, thereby driving the slider 21 to slide from a position close to the second arm 123 to a position away from the second arm 123. That is, the at least one functional component 22 is slid from a position at which the at least one functional component 22 is covered by the screen 11 to a position at which the at least one functional component 22 is exposed out of the screen 11. When the motor 32 drives the rotation shaft 31 to rotate in a direction opposite to the preset direction, the protrusion 211 may slide relative to the back cover 12 from the second rotating end 313 to the first rotating end 312 along the first guiding groove 311, thereby driving the at least one functional component 22 to slide from the position at which the at least one functional component 22 is exposed out of the screen 11 to the position at which the at least one functional component 22 is covered by the screen 11.

In the embodiment shown in FIGS. 10-11, the driving mechanism 30 may include a pair of motors 32, and each motor 32 may be coupled to a rotation shaft 31. The pair of motors 32 may be spaced apart from each other in a direction generally parallel to the second arm 123. Of course, in other embodiments, the driving mechanism 30 may also include only one motor 32.

In this embodiment, referring to FIG. 12, the slider 21 may further include a first outer frame 216. The first outer frame 216 may be fixedly connected to the holder 212. The first outer frame 216 may include a pair of first splicing plates 217 opposite to each other and a first side plate 218 fixedly connected between the pair of first splicing plates 217. A length of the first side plate 218 may be less than or equal to a length of the first splicing plate 217. The first side plate 218 may be fixed to the top wall 214 of the holder 212. The first splicing plate 217 and the connecting bar 215 may be spaced apart from each other. When the slider 21 slides to be covered by the screen 11, the connecting bar 215 may be located at the inner side of the pair of first arms 122 (that is, the side of one first arm 122 that faces towards the other first arm 122), and the first splicing plate 217 may be located at an outer side of the first arm 122 (that is, the side of one first arm 122 that faces away from the other first arm 122). At least one functional component 22 may be fixed to an inner side of the first outer frame 216 (that is, the at least one functional component 22 may be disposed within the space enclosed by the first frame 216 and the middle frame 122). The pair of first splicing plates 217 may be slidably coupled to the outer sides of the pair of first arms 122 respectively.

One end of the first arm 122 that is connected to the second arm 123 may define a sliding groove 125. The sliding groove 125 may extend along a lengthwise direction of the pair of first arms 122. The first splicing plate 217 may be slidably coupled to the sliding groove 125. The sliding groove 125 may provide a guidance to the first splicing plate 217, thereby preventing the slider 21 from being misaligned with the back cover 12. That is, the slider 21 may be restricted to slide relative to the back cover 12 only in the direction parallel to the screen 11. When the first outer frame 216 is in the retraction state relative to the screen 11, the first splicing plate 217 may cover the sliding groove 125, and the first side plate 218 may abut against the first edge 111 of the screen 11. In this way, the appearance of the mobile terminal 100 may be made concise.

Referring to FIGS. 10-11, the back cover 12 may further include a pair of outer side plates 126 opposite to each other. Each outer side plate 126 may be fixed to the outer side of each first arm 122, and configured to cover the first arm 122. When the first outer frame 216 is in the retraction state relative to the screen 11, each outer side plate 126 may be spliced with the corresponding first splicing plate 217, in order to form a smooth splicing surface on the periphery of the back cover 12, and thus the appearance of the back cover 12 may be improved. The outer side plate 126 and the first splicing plate 217 may both abut against the third edge 113 of the screen 11. In this way, the appearance of the mobile terminal 100 may be made concise, and it is possible to provide a protection to both the slider 21 and the screen 11.

Referring to FIGS. 10-11, the back cover 12 may further include a second outer frame 127. The second outer frame 127 may be detachably connected to the pair of first arms 122, located at the outer side of the third arm 124, and configured to cover the third arm 124. The second outer frame 127 may have a shape substantially the same as that of the first outer frame 216, in order to improve the appearance of the mobile terminal 100. More specifically, the second outer frame 127 may include a pair of second splicing plates 128 and a second side plate 129 fixedly connected between the pair of second splicing plates 128. The pair of second splicing plates 128 may be detachably connected to the pair of first arms 122, and the second side plate 129 may cover the third arm 124. A length of each outer side plate 126 may be less than a length of each first arm 122, such that a section of the first arm 122 that is connected to the third arm 124 may be exposed, and the second splicing plate 128 may cover the exposed section of the first arm 122. That is, the exposed section of the first arm 122 may be engaged with the inner side of the second splicing plate 218 (that is, one side of one second splicing plate 218 that faces towards the other second splicing plate 218). After each second splicing plate 128 is engaged with the corresponding first arm 122, each second splicing plate 218 may be spliced with each outer side plate 126, in order to form a smoothly splicing surface on the periphery of the back cover 12. The pair of second splicing plates 128, the pair of outer side plates 126, and the pair of first splicing plates 217 may all abut against the third edge 113 of the screen 11. The first outer frame 216, the pair of outer side plates 126, and the second outer frame 127 may cooperatively enclose a rectangular outer frame, in order to protect the periphery of the screen 11, and to form the periphery of the mobile terminal 100.

Figure 13:
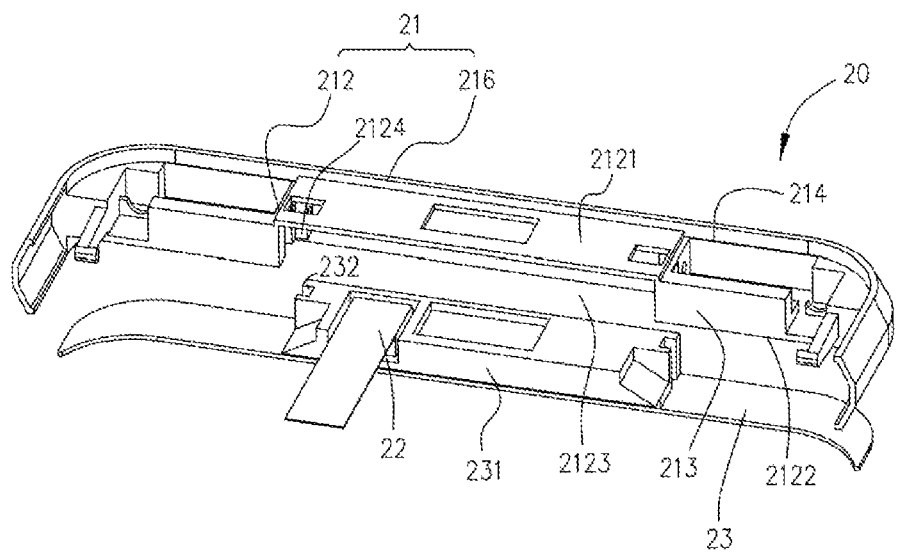
FIG. 13 is an exploded view of the slidable assembly of the mobile terminal according to an embodiment of the present disclosure.

Further, referring to FIGS. 12-13, in some embodiments, the slidable assembly 20 may further include a first cover 23 slidably coupled to the slider 21 and covering the at least one functional component 22. The first cover 23 may be substantially parallel to the screen 11, and may be covered by the screen or exposed out of the screen 11 along with the slider 21. At least one signal transmission hole 23a may be further defined in the first cover 23 at a position corresponding to the at least one functional component 22 (as shown in FIG. 12).

In this embodiment, referring further to FIGS. 12-13, the first cover 23 may cover the holder 212 and further cover the at least one functional component 22 fixed to the holder 212. The holder 212 may include a first side face 2121 connected between the bottom wall 213 and the top wall 214 and close to the screen 11, and a second side face 2122 opposite to the first side face 2121. Both the first side face 2121 and the second side face 2122 may be substantially parallel to the screen 11. The holder 212 may define a first receiving groove 2123 on the second side face 2122. The at least one functional component 22 may be received in first receiving groove 2123. The first cover 23 may cover the first receiving groove 2123. At least one signal transmission hole 23a may communicate with the first receiving groove 2123.

In this embodiment, a first boss 231 may be disposed at one side of the first cover 23 that faces towards the holder 212. The first boss 231 may cooperate with the first receiving groove 2123. The at least one function device 22 may be fixed to the first boss 231 and received in the first receiving groove 2123, and thus it is convenient to fix the at least one functional component 22 into the first receiving groove 2123.

Furthermore, the first cover 23 may be slidably connected to the slider 21, and a sliding direction of the first cover 23 may be substantially parallel to the normal direction of the screen 11. After the first cover 23 is in the extension state, the first cover 23 may slide to be substantially flush with the screen 11.

In this embodiment, referring to FIG. 13, a guiding rail 2124 may be further disposed on a sidewall defining the first receiving groove 2123, and a sidewall of the first boss 231 may correspondingly define a guiding groove 232 matching with the guiding rail 2124. In this embodiment, the guiding rail 2124 may extend in a direction substantially perpendicular to the screen 11. The guiding rail 2124 may cooperate with the guiding groove 232, in order to provide a guidance to the slide of the first cover 23 relative to the holder 212. When the rotation shaft 31 drives the protrusion 211 to slide to the second guiding groove 314, the slider 21 may stop sliding, and the first cover 23 may slide to the position at which the first cover is exposed out of the screen 11. When the protrusion 211 continues to slide along the second guiding groove 314, the rotation shaft 31 may continue to rotate and provide torque to the first cover 23. In this way, the first cover 23 may slide in a direction away from the holder 212 by means of the cooperation between the guiding rail 2124 and the guiding groove 232. Thus, the first cover 23 may be substantially flush with the screen 11. After the first cover 23 slides to be substantially flush with the screen 11, there is no gap between the screen 11 and the first cover 23, and thus it is possible to prevent the impurities from entering the receiving chamber 13 due to the gap likely present between the screen 11 and the first cover 23.

Figure 14:
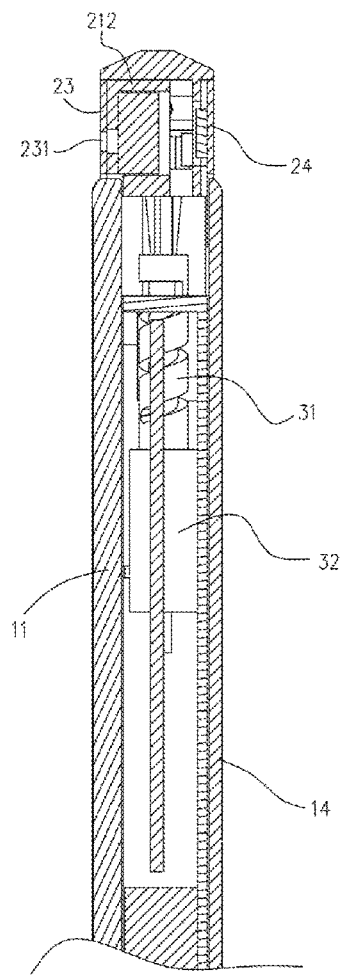
FIG. 14 is another partially sectional view of the mobile terminal according to an embodiment of the present disclosure.
Figure 15:
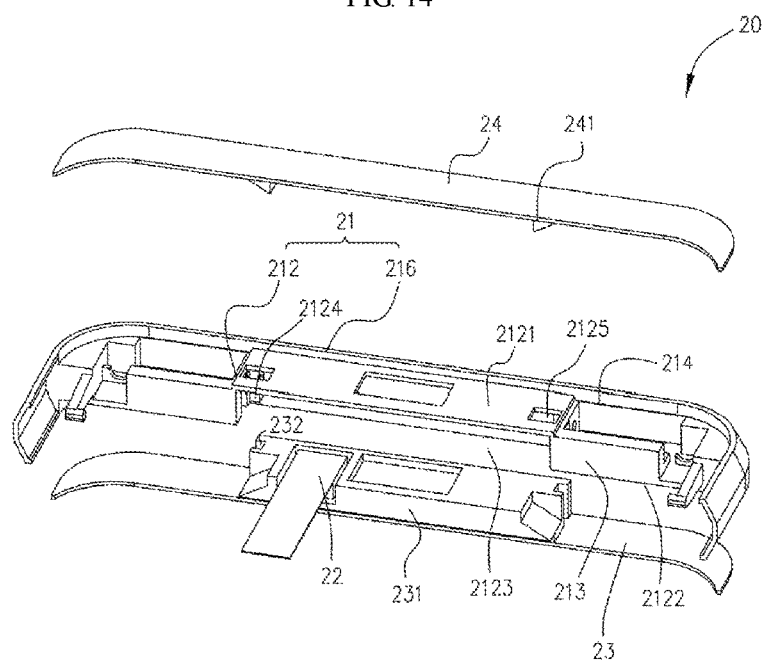
FIG. 15 is another exploded view of the slidable assembly of the mobile terminal according to an embodiment of the present disclosure.

Referring to FIG. 14 and FIG. 15, the slidable assembly 20 may further include a second cover 24 opposite to the first cover 23. The second cover 24 may be substantially parallel to the first cover 23, and the at least one functional component 22 may be fixed between the first cover 24 and the second cover 23. In this case, the second cover 24 may have a shape substantially the same as that of the first cover 23. The second cover 24 may be configured to cover one side of the at least one functional component 22 that faces away from the first cover 23. The first cover 23 and the second cover 24 may respectively decorate one side of the holder 212 that faces towards the user and the other side of the holder 212 that faces away from the user, and further provide a protection to the at least one functional component 22.

More specifically, referring to FIGS. 14-15, in this embodiment, the second cover 24 may be located at one side of the holder 212 that faces away from the first cover 23. The back cover 12 may include a back plate 14 opposite to the screen 11. The back plate 14 may have a shape substantially the same as that of the screen 11. The middle frame 121 may be sandwiched between the screen 11 and the back plate 14, such that the screen 11, the middle frame 121, and the back plate 14 may cooperatively define the receiving chamber 13. That is, the driving mechanism 30 may be fixed between the screen 11 and the back plate 14. The second cover 24 may be covered by the back plate 14 or exposed out of the back plate 14 along with the slider 21. When the slider 21 is in the retraction state relative to the screen 11, the second cover 24 may be covered by the back plate 14. However, when the slider 21 is in the extension state, the second cover 24 may be exposed out of the back plate 14.

Figure 16:
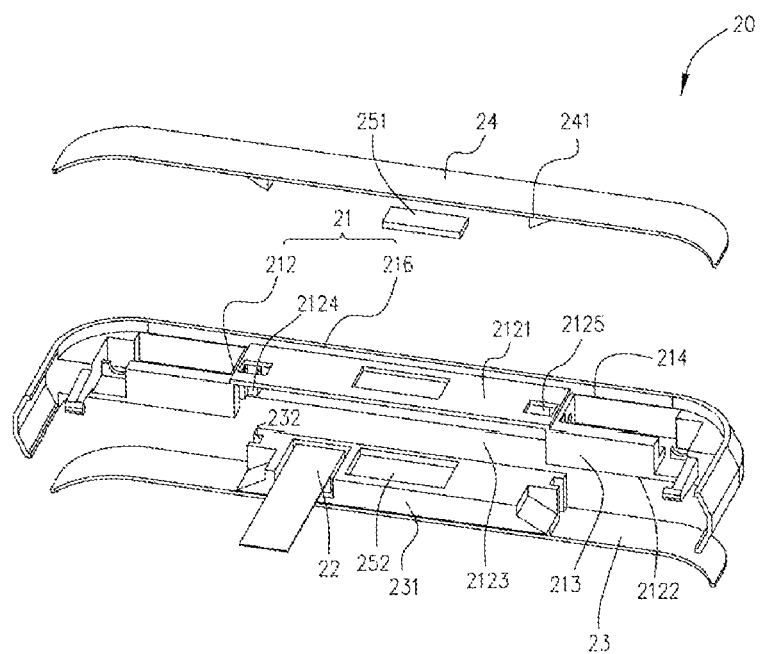
FIG. 16 is a further exploded view of the slidable assembly of the mobile terminal according to an embodiment of the present disclosure.

Furthermore, referring to FIG. 16, the second cover 24 may be slidably coupled to the slider 21, and a sliding direction of the second cover may be substantially parallel to the normal direction of the screen 11. After the second cover 24 is in the extension state relative to the screen 11, the second cover 24 may slide to be substantially flush with the back plate 14 relative to the slider 21.

In this embodiment, the holder 212 may define a through hole 2125 extending from the second side face 2122 to the first side face 2121. The through hole 2125 may communicate with the first receiving groove 2123. A second boss 241 may be arranged at one side of the second cover 24 that faces towards the holder 212, and the second boss 241 may be slidably engaged with the through hole 2125. The second boss 241 may extend in the direction substantially perpendicular to the screen 11. The second boss 241 may cooperate with the through hole 2125, in order to provide a guidance to the sliding of the second cover 24 relative to the holder 212. After the second cover 24 is slid to be flush with the back plate 14, there is no gap between the back plate 14 and the second cover 24, and thus it is possible to prevent the impurities from entering the receiving chamber 13 between the back plate 14 and the second cover 24. When the rotation shaft 31 drives the protrusion 211 to slide to the second guiding groove 314, the slider 21 may stop sliding, and the second cover 24 may slide to the position at which the second cover 24 may be exposed out of the backing plate 14. When the protrusion 211 continues to slide along the second guiding groove 314, the rotation shaft 31 may continue to rotate, and the rotation shaft 31 may provide torque to the second cover 24, such that the second cover 24 may slide in a direction away from the holder 212 by means of the cooperation between the second boss 241 and the through hole 2125, and thus the second cover 24 may be substantially flush with the back plate 14. The second cover 24 and the first cover 23 may slide away from each other simultaneously, or may slide relative to each other in sequence. The first cover 23 and the second cover 24 may respectively decorate one side of the slidable assembly 20 that faces towards the user and the other side of the slidable assembly 20 that faces away from the user, thereby improving the appearance of the mobile terminal 100.

Figure 17:
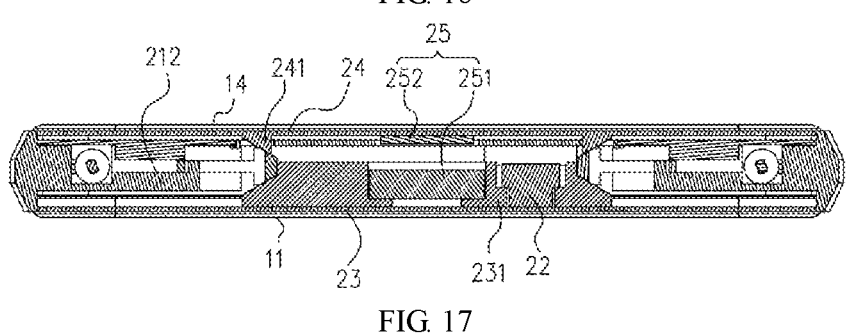
FIG. 17 is a further sectional view of the mobile terminal according to an embodiment of the present disclosure.

Further, referring to FIG. 17, the slidable assembly 20 may further include a locking assembly 25. The locking assembly 25 may include a first locking member 251 fixedly connected to the first cover 23 and a second locking member 252 fixedly connected to the second cover 24. The first locking member 251 and the second locking member 252 may exert a traction force to each other, in order to drive the first cover 23 and the second cover 24 to move towards each other.

In some embodiments, both the first locking member 251 and the second locking member 252 may be magnetic elements. Optionally, at least one of the first locking member 251 and the second locking member 252 may be a permanent magnet or an electromagnet. In some embodiments, the first locking member 251 may be directly fixed to a top surface of the first boss 231. In other embodiments, the first locking member 251 may be directly disposed on one of the at least one functional component 22, and the at least one functional component 22 may be further fixed to the first boss 231. For example, the at least one functional component 22 may include a microphone, and the first locking member 251 may be the permanent magnet disposed on the microphone. The second locking member 252 may be fixed to a side face of the second cover 24 that faces towards the holder 212. The second locking member 252 and the first locking member 251 may attracted each other by magnetic forces generated therebetween, such that the first locking member 251 and the second locking member 252 may provide a traction force that drives the first locking member 251 and the second locking member 252 to move towards each other. After the driving mechanism 30 drives the first cover 23 and the second cover 24 to slide away from each other and the driving mechanism 30 stops providing driving forces to the first cover 23 and the second cover 24, the first cover 23 and the second cover 24 may move towards each other under the traction force generated by the locking assembly 25, such that the first cover 23 and the second cover 24 may be respectively retracted to positions at which they abut against the holder 212. In this way, it is convenient for the first cover 23 and the second cover 24 to slide to the position at which they are covered by the screen 11 along with the slider 21.

In other embodiments, the first locking member 251 may be a first elastic piece fixed to the first boss 231. The second locking member 252 may be a second elastic piece fixed to the second cover 24. The locking assembly 25 may also include a third elastic piece coupled between the first locking member 251 and the second locking member 252. The third elastic piece may be elastically coupled to the first locking member 251 and the second locking member 252, and configured to provide an elastic force to drive the first locking member 251 and the second locking member 252 to move towards each other.

Figure 18:
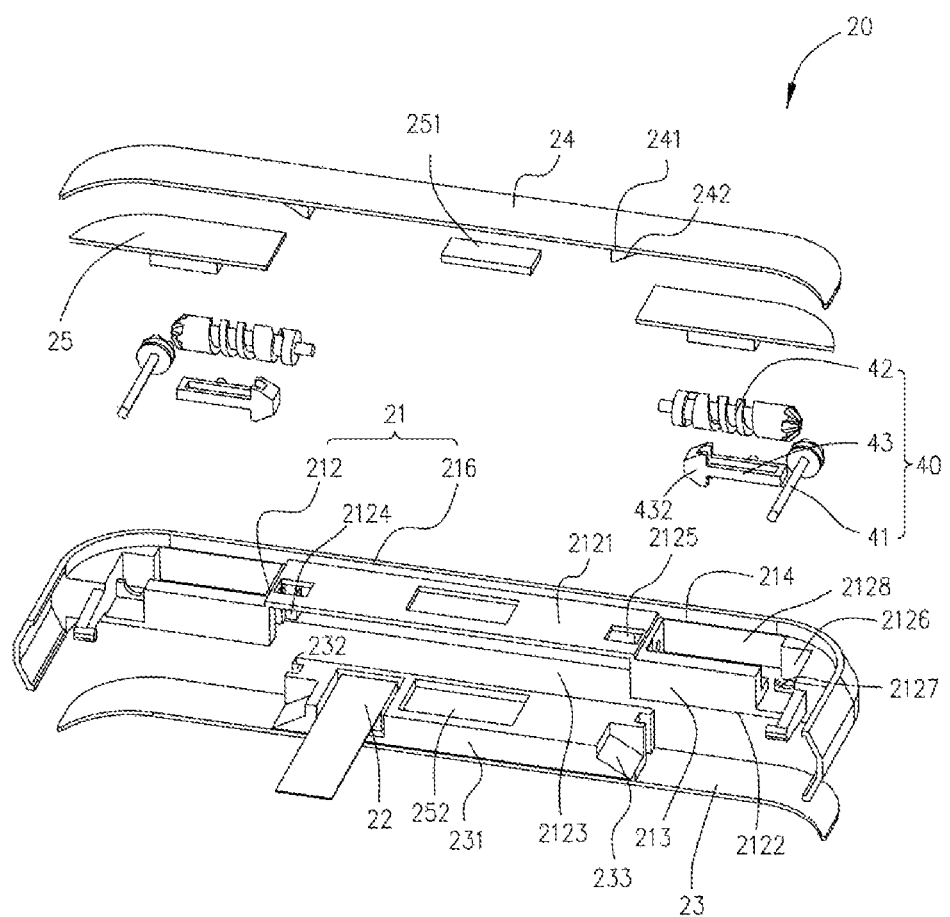
FIG. 18 is a further exploded view of the slidable assembly of the mobile terminal according to an embodiment of the present disclosure.
Figure 19:
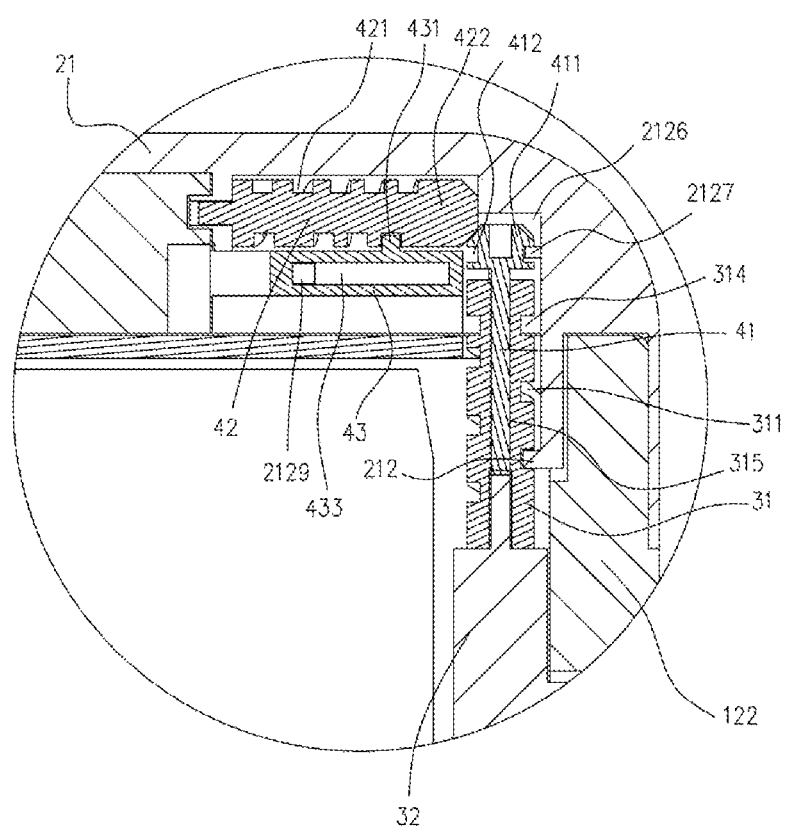
FIG. 19 is a partially enlarged view of the section II of the mobile terminal shown in FIG. 7.
Figure 20:
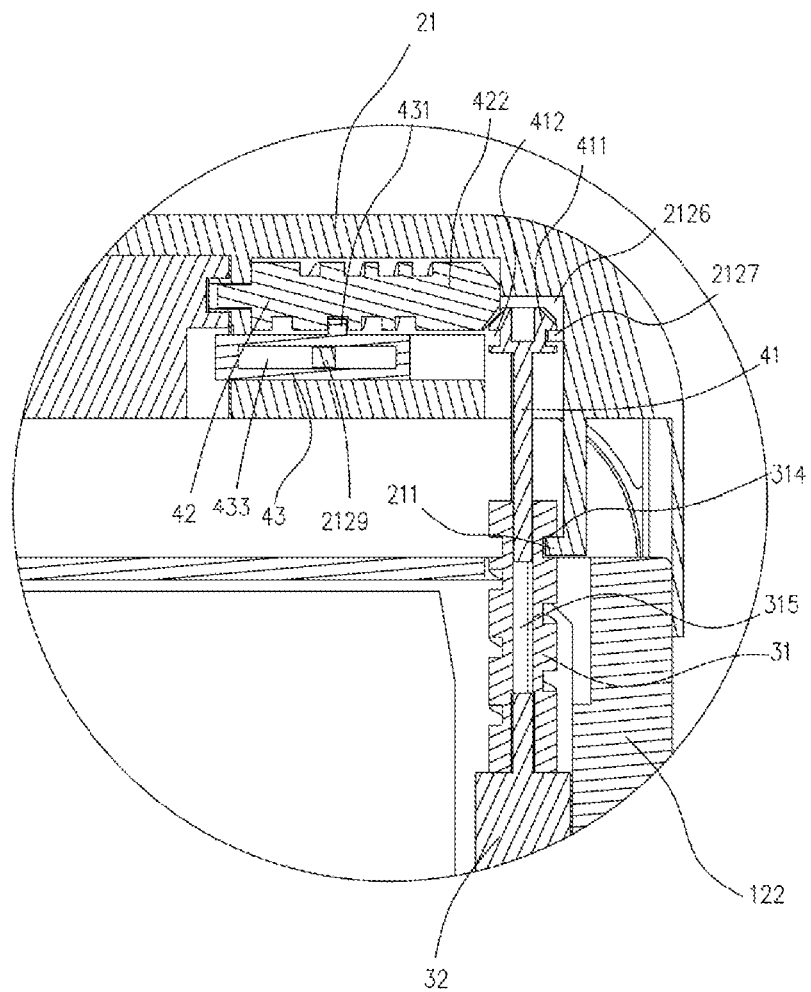
FIG. 20 is a partially enlarged view of the section III of the mobile terminal shown in FIG. 9.
Figure 21A:
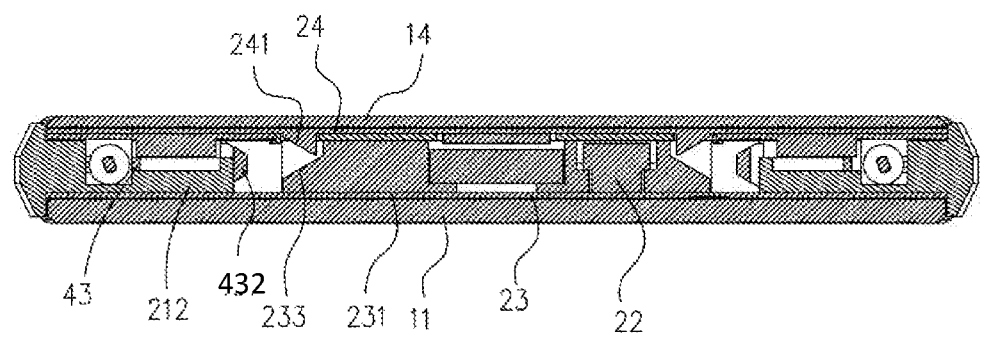
FIG. 21a is a sectional view of the mobile terminal according to an embodiment of the present disclosure; wherein the mobile terminal is in the retraction state.
Figure 21B:
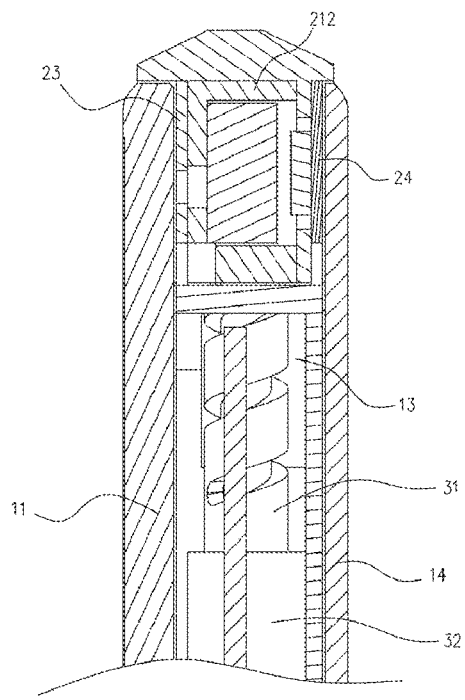
FIG. 21b is another sectional view of the mobile terminal according to an embodiment of the present disclosure; wherein the mobile terminal is in the retraction state.
Figure 21C:
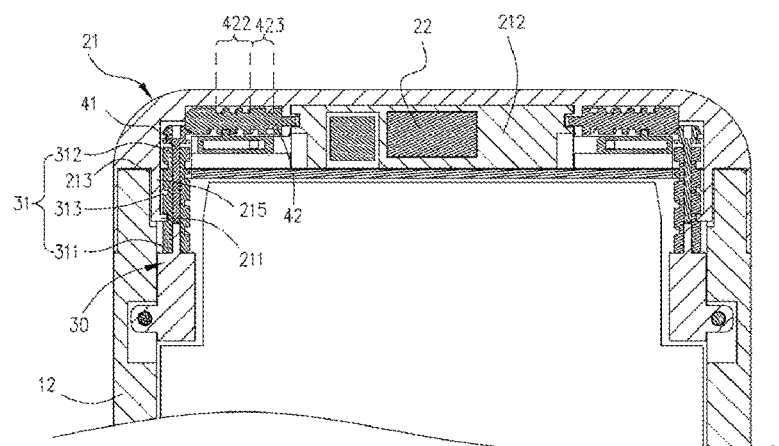
FIG. 21c is a further sectional view of the mobile terminal according to an embodiment of the present disclosure; wherein the mobile terminal is in the retraction state.

Referring to FIG. 18, FIG. 19 and FIG. 20, the mobile terminal 100 may further include a transmission mechanism 40 coupled to the first cover 23, the second cover 24, and the driving mechanism 30. The transmission mechanism 40 may be configured to transmit the power generated by the driving mechanism 30 to the first cover 23 and the second cover 24, in order to drive the first cover 23 and the second cover 24 to slide relative to the slider 21.

In this embodiment, the transmission mechanism 40 may include a first adapting shaft 41, and an axial direction of the first adapting shaft 41 may be substantially parallel the sliding direction of the slider 21. The first adapting shaft 41 may be slidably coupled to the driving mechanism 30 along with the slider 21, and may be rotatable when driven by the driving mechanism 30. The first adapting shaft 41 may transmit rotational torque to the first cover 23 to drive the first cover 23 to slide. The first transfer shaft 41 may also transmit the rotational torque to the second cover 24 to drive the second cover 24 to slide.

More specifically, referring to FIG. 19, in some embodiments, the holder 212 may further define a second receiving groove 2126 extending from the second side face 2122 to the first side face 2121. A sliding channel 315 may be defined in the rotation shaft 31 from an end face of the rotation shaft 31 that is away from the motor 32 to an end face of the sliding channel 315 that is connected to the motor 32. In some embodiments, the sliding channel 315 may be an irregularly-shaped hole. One end of the first adapting shaft 41 may be inserted into the sliding channel 315 and slidably engaged with the sliding channel 315. The rotation shaft 31 may drive the first adapting shaft 41 to rotate relative to the back cover 12. The other end of the first adapting shaft 41 may be received in the second receiving groove 2126 and further connected to the holder 212, such that the first adapting shaft 41 may be slidable relative to the rotation shaft 31 along with the holder 212.

As shown in FIG. 19, the holder 212 may further include a restricting protrusion 2127. The restricting protrusion 2127 may be arranged in the second receiving groove 2126, and rotatably coupled to the first adapting shaft 41. The transmission mechanism 40 may further include a first bevel gear 411. The first bevel gear 411 may be fixedly coupled to one end of the first adapting shaft 41 that is away from the motor 32, and further received in the second receiving groove 2126. The first bevel gear 411 may further define a restricting groove 412 on the peripheral wall in the peripheral direction, and the restricting protrusion 2127 may be rotatably engaged with the restricting groove 412. By using the cooperation between the restricting protrusion 2127 and the restricting groove 412 of the first bevel gear 411, the first bevel gear 411 may rotate only relative to the holder 212, and be slidable relative to the back cover 12 along with the holder 212. The first bevel gear 411 may transmit the torque of the rotation shaft 31 to the first cover 23 and the second cover 24 via the first adapting shaft 41, in order to drive the first cover 23 and the second cover 24 to slide relative to the slider 21.

Referring to FIG. 18, FIG. 19 and FIG. 20, in some embodiments, the transmission mechanism 40 may further include a second adapting shaft 42 and a push rod 43. The second adapting shaft 42 may be coupled to the first adapting shaft 41. The second adapting shaft 42 may define a third guiding groove 421 on a peripheral wall of the second adapting shaft 42 and extending along a spiral curve. A sliding block 431 may be arranged on the push rod 43 and slidably coupled to the third guiding groove 421. The push rod 43 may be slidable relative to the slider 21 along an axis direction of the second adapting shaft 42, such that the first cover 23 and the second cover 24 may be driven to slide.

In this embodiment, the second adapting shaft 42 may be rotatably coupled to the holder 212. The second adapting shaft 42 may have an axial direction substantially perpendicular to the first adapting shaft 41 and substantially parallel to the screen 11, and thus the second adapting shaft 42 is capable of providing sufficient stroke to the first cover 23 and the second cover 24. Furthermore, the holder 212 may further define a third receiving groove 2128. The third receiving groove 2128 may extend from the second side face 2122 to the first side face 2121, and further communicate with the second receiving groove 2126. The second adapting shaft 42 may be received in the second receiving groove 2126. One end of the second adapting shaft 42 may be rotatably coupled to the first bevel gear 411, and the other end of the second adapting shaft 42 may be rotatably coupled to the sidewall defining the second receiving groove 2126. The transmission mechanism 40 may also include a second bevel gear 422 fixedly coupled to the second adapting shaft 42. The second bevel gear 422 may be engaged with the first bevel gear 411. The first adapting shaft 41 may drive the second adapting shaft 421 to rotate by means of the cooperation between the first bevel gear 411 and the second bevel gear 422. The third receiving groove 2128 may communicate with the first receiving groove 2123. The sliding block 431 may be slidable in the third receiving groove 2128 and may extend into the first receiving groove 2123, in order to push the first cover 23 and the second cover 24 to slide.

Further, referring to FIG. 18, FIG. 19 and FIG. 20, a first wedge block 233 may be arranged on the first cover 23. A push block 432 cooperating with the first wedge block 233 may be arranged at one end of the push rod 43. A second wedge block 242 cooperating with the push block 432 may be arranged on the second cover 24. The first wedge block 233 may be arranged at one side of the first boss 231 that is close to the third receiving groove 2128. The second wedge block 242 may be arranged on the second boss 241 and opposite to the first wedge block 233. Driven by the push rod 43, the pushing block 432 may slide in a direction away from the first adapting shaft 41, pushing the first wedge block 233 and the second wedge block 242 to slide away from each other in the direction substantially perpendicular to the screen 11, thereby pushing the first cover 23 and the second cover 24 to slide away from each other. When the push rod 43 slides towards the first adapting shaft 41, the push block 432 may be separated from the first wedge block 233 and the second wedge block 242, such that the first cover 23 and the second cover 24 may move towards each other due to the locking assembly 25. In some embodiments, the push block 432 may be in shape of a wedge.

In this embodiment, the holder 212 may further include a guiding block 2129, and the guiding block 2129 may be arranged on the bottom wall of the third receiving groove 2128. The push rod 43 may define a guiding groove 433 in the lengthwise direction of the push rod 43. The guiding block 2129 may be inserted into the guiding groove 433, and slidable in the guiding groove 433. Both ends of the guiding groove 433 may be closed, thereby preventing the guiding block 2129 from falling off the push rod 43. When the push rod 43 is driven to slide along a direction substantially parallel to the axis direction of the second adapting shaft 42, the guiding block 2129 may provide a guidance to the movement of the push rod 43.

In some embodiments, referring to FIG. 18 together, the slidable assembly 20 may further include a protective cover 29. The protective cover 29 may be fixedly connected to the holder 212, cover the second receiving groove 2126 and the third receiving groove 2128, and may be located between the first cover 23 and the second cover 24. The protective cover 29 may provide a protection to the transmission mechanism 40.

Furthermore, referring to FIGS. 21a, 21b, 21c, FIGS. 22a, 22b, 22c and FIGS. 23a, 23b and 23c, the third guiding groove 421 may extend in a non-equidistant spiral curve. The third guiding groove 421 may include a first section 422 and a second section 423. A pitch of the first section 422 may be greater than that of the second section 423. When the slider 431 slides in the first section 422, the push rod 43 may have a first sliding speed. When the sliding block 431 slides in the second section 423, the push rod 43 may have a second sliding speed. In some embodiments, the second sliding speed may be greater than the first sliding speed. The first section 422 may correspond to the first guiding groove 311, while the second section 423 may correspond to the second guiding groove 314. That is, when the protrusion 211 slides in the first guiding groove 311, the sliding block 431 may slide in the first section 422. When the protrusion 211 slides in the second guiding groove 314, the sliding block 431 may slide in the second section 423.

Figure 22A:
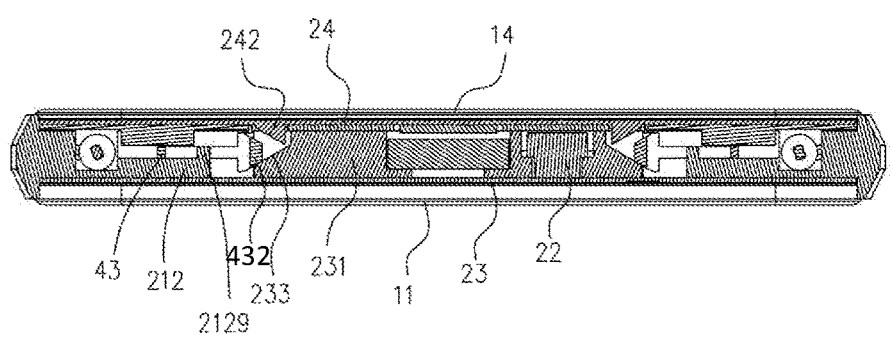
FIG. 22a is a sectional view of the mobile terminal according to an embodiment of the present disclosure; wherein the mobile terminal is in the extension state.
Figure 22B:
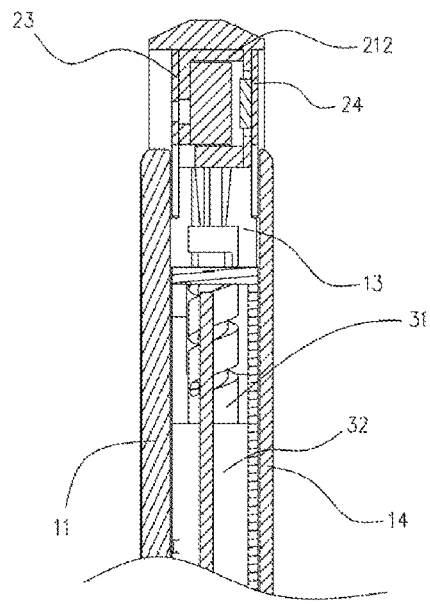
FIG. 22b is another sectional view of the mobile terminal according to an embodiment of the present disclosure; wherein the mobile terminal is in the extension state.
Figure 22C:
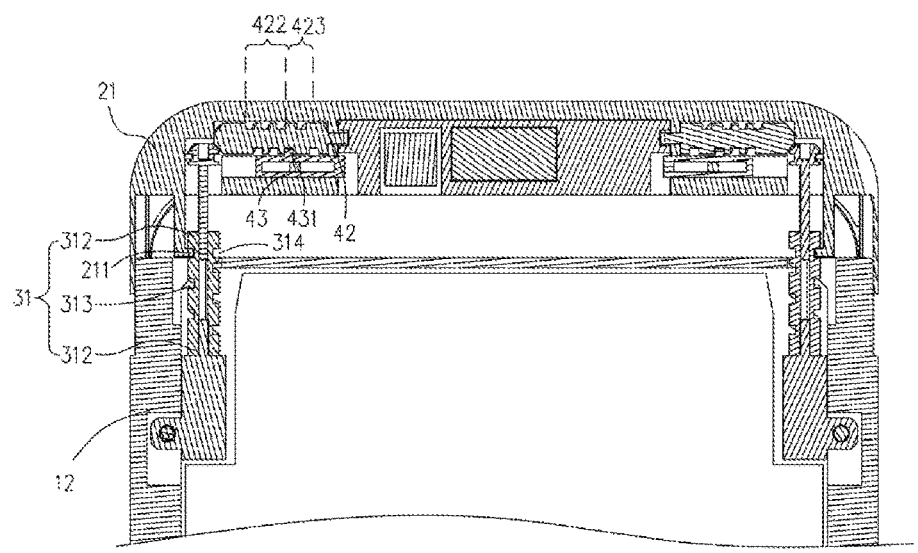
FIG. 22c is a further sectional view of the mobile terminal according to an embodiment of the present disclosure; wherein the mobile terminal is in the extension state.
Figure 23A:
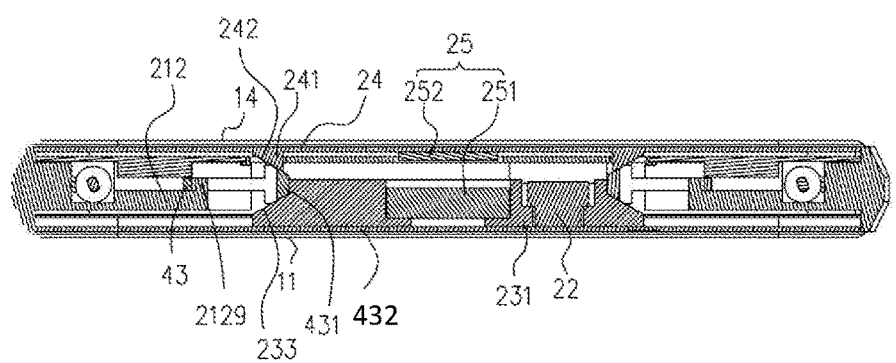
FIG. 23a is a further sectional view of the mobile terminal according to an embodiment of the present disclosure; wherein the mobile terminal is in the extension state.
Figure 23B:
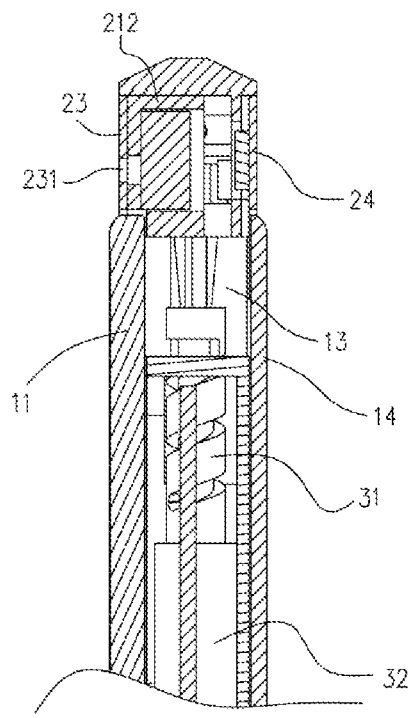
FIG. 23b is still a further sectional view of the mobile terminal according to an embodiment of the present disclosure; wherein the mobile terminal is in the extension state.
Figure 23C:
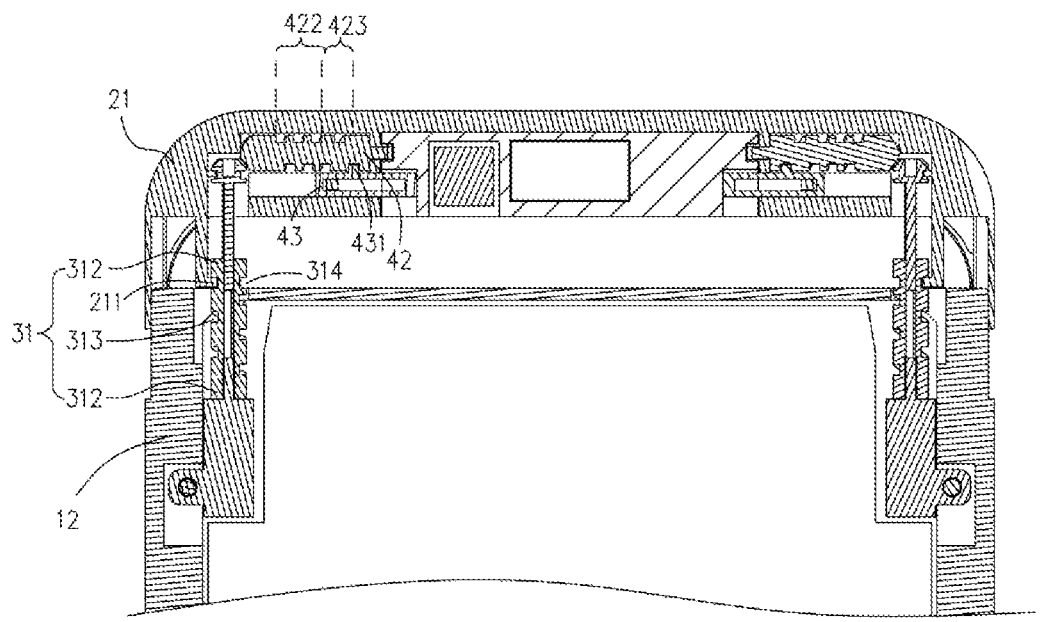
FIG. 23c is still a further sectional view of the mobile terminal according to an embodiment of the present disclosure; wherein the mobile terminal is in the extension state.

When the protrusion 211 enters the second guiding groove 314 from the first guiding groove 311 of the rotation shaft 31, the sliding block 431 of the push rod 43 may gradually enter the second section 423 from the first section 422 of the third guiding groove 421. At this time, the push block 432 may firstly get into contact with the corresponding first wedge block 233 (as shown in FIG. 22a), and the push block 432 may then get into contact with the corresponding second wedge block 242 (as shown in FIG. 23a). In this way, the push block 432 may push the first cover 23 and the second cover 24 to move away from each other, such that the first cover 23 may be substantially flush with the screen 11, and the second cover 24 may be substantially flush with the back cover 14. In this way, the step formed between the screen 11 and the first cover 23, and that formed between the second cover 24 and the back cover 14 may be eliminated and disappeared.

When the slidable assembly 20 needs to be received in the receiving chamber 13, the driving mechanism 30 may drive the rotation shaft 31 to rotate in a direction opposite to the preset direction. The actual motion processes may be equivalent to the reverse processes of the above processes, and details will not be described herein. The difference lies in that, when the push block 432 is driven to be separated from the first cover 23 and the second cover 24, the first cover 23 and the second cover 24 may move towards each other and may be further reset due to the attraction between the first locking member 251 and the second locking member 252. At this time, the protrusion 211 may enter the first guiding groove 311 from the second guiding groove 314 of the rotation shaft 31. The sliding block 431 of the push rod 43 may gradually enter the first section 422 from the second section 423 of the second adapting shaft 42, and the driving mechanism 30 may drive the slidable assembly 20 to be received in the receiving chamber 13.

In this embodiment, the at least one functional component 22 may include a camera module and a microphone. The camera module and the microphone may be both fixed to the slider 21, and spaced apart from each other. The first cover 23 may further define a fourth receiving groove, and the fourth receiving groove may be defined in the first boss 231. The camera module and the microphone 222 may be both fixed in the fourth receiving groove.

Figure 24:
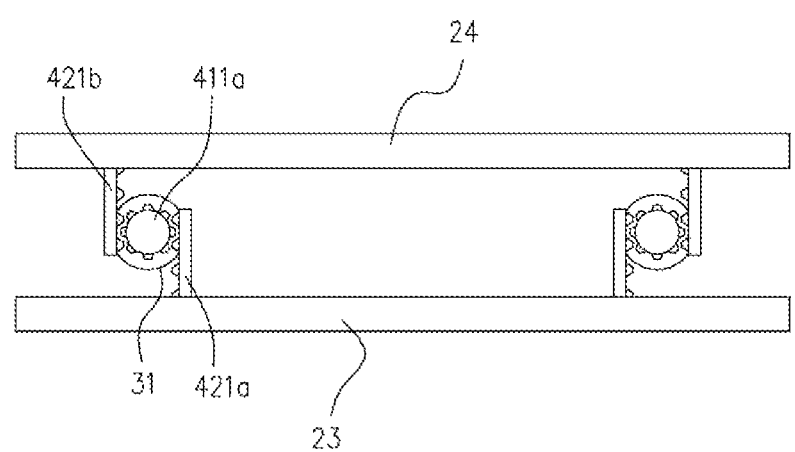
FIG. 24 is a sectional view of a slidable assembly of the mobile terminal according to another embodiment of the present disclosure.

In the above embodiment, the transmission mechanism includes the bevel gear, the adapting shaft, and the push rod. However, in other embodiments, as shown in FIG. 24, the transmission mechanism 40 may further include a cylindrical gear 411a. The cylindrical gear 411a may be fixedly coupled to one end of the first adapting shaft 41 that is away from the motor 32. The cylindrical gear 411a may drive the first cover 23 and the second cover 24 to slide relative to the slider 21. Further, the transmission mechanism 40 may include a first rack 421a and a second rack 421b engaged with the cylindrical gear 411a. The first rack 421a and the second rack 421b may be both perpendicular to the screen 11. The cylindrical gear 411a may be located between the first rack 421a and the second rack 421b. The first rack 421a may be fixedly connected to the first cover 23, and the second rack 421b may be fixedly connected to the second cover 24. The cylindrical gear 411a may rotate to drive the first rack 421a and the second rack 421b to move in the direction perpendicular to the screen 11, thereby driving the first cover 23 and the second cover 24 to slide away from each other or towards each other.

In another aspect, a mobile terminal may be provided. The mobile terminal may include: a screen 11, a back cover 12 covering the screen 11, a middle frame 121 fixedly connected between the screen 11 and the back cover 12, a slider 21, at least one functional component 22, a first cover 23, and a driving mechanism 30. The slider 21 may be retractable and slidable relative to the back cover 12 in a direction substantially parallel to the screen 11, and movable between a first position at which the slider is covered by the screen 11 and a second position at which the slider is exposed out of the screen 11. The at least one functional component 22 may be fixed to the slider 21. The first cover 23 may be slidably coupled to the slider 21, cover the at least one functional component 22, and slidable along with the slider 21. When the slider 21 is at the first position, the first cover 23 may be covered by the screen 11. However, when the slider 21 is at the second position, the first cover 23 may be exposed out of the screen 11, and substantially flush with the screen 11. The driving mechanism 30 may be fixed between the screen 11 and the back cover 12, and configured to drive the slider 21 to slide.

In a further aspect, an electronic device may be provided. The, electronic device may include: a screen 11 a display area, a back cover 12 covering the screen 11, a slider 21, at least one functional component 22, a first cover 23, and a driving mechanism 30. The slider 21 may be retractable and slidable relative to the back cover 12 in a direction substantially parallel to the screen 11, and switchable between a retraction state in which the slider 21 is covered by the screen 11 and an extension state in which the slider 21 is exposed out of the screen 11. The at least one functional component 22 may be fixed to the slider 21. When the slider 21 slides to be covered by the screen 11, the display area at least partially covers the at least one functional component 21. The first cover 23 may be slidably coupled to the slider 21, cover the at least one functional component 22, and slidable along with the slider 21 such that the first cover 23 is covered by the screen 11 or exposed out of the screen 11. When the first cover 23 is exposed out of the screen 11, the first cover 23 may be substantially flush with the screen 11. The driving mechanism 30 may be fixed between the screen 11 and the back cover 12, and configured to drive the slider 21 to slide.

In the mobile terminal provided in the present disclosure, the driving mechanism is fixed to the back cover, and drives the slider to slide relative to the screen, thereby driving the at least one functional component on the slider to slide relative to the screen. In this way, the at least one functional component may be covered by the screen or exposed out of the screen along with the slider. When the user needs to carry the mobile terminal, the at least one functional component may be covered by the screen. However, when it is required to use the at least one functional component, the at least one functional component may be exposed out of the screen. Therefore, it is unnecessary to arrange the at least one function component in the non-display area. In this way, it is possible to reduce the proportion of the non-display area, effectively increase the screen ratio of the screen, and improve the user experience.

The above is an embodiment of the present disclosure. It should be noted that, those skilled in the art can also make several improvements and modifications without departing from the principles of the present disclosure. All these shall be covered within the protection scope of the present disclosure.

What is claimed is:

1. A mobile terminal, comprising:
a screen;
a back cover, covering the screen;
a slidable assembly, comprising:
a slider, retractable and slidable relative to the back cover in a direction substantially parallel to the screen, and switchable between a retraction state in which the slider is covered by the screen and an extension state in which the slider is exposed out of the screen;
at least one functional component, fixed to the slider; and
a first cover, slidably coupled to the slider, covering the at least one functional component, and slidable along with the slider such that the first cover is covered by the screen or exposed out of the screen; wherein when the first cover is exposed out of the screen, the first cover is substantially flush with the screen; and
a driving mechanism, fixed between the screen and the back cover, and configured to drive the slider to slide;
wherein the back cover comprises a middle frame fixedly connected to the screen;
the middle frame comprises a pair of first arms opposite to each other, each of the air of first arms defines a sliding groove extending along a lengthwise direction of the pair of first arms;
the slider comprises a first outer frame, and the first outer frame is slidable relative to the sliding groove; the at least one functional component is fixed in a space defined by the first outer frame and the middle frame.

2. The mobile terminal of claim 1, wherein the driving mechanism comprises a rotation shaft rotatably coupled to the back cover; a lengthwise direction of the rotation shaft is substantially parallel to a sliding direction of the slider;
a first guiding groove extending in a spiral curve is defined on an peripheral wall of the rotation shaft, and a protrusion slidably coupled to the first guiding groove is arranged on the slider; the protrusion is slidable along the first guiding groove to drive the slider to slide relative to the back cover.

3. The mobile terminal of claim 2, wherein a second guiding groove communicating with the first guiding groove is defined on the peripheral wall of the rotation shaft at one end of the rotation shaft that is close to the slider in a peripheral direction of the rotation shaft, and the second guiding groove has an unclosed configuration; the protrusion is slidable along the second guiding groove.

4. The mobile terminal of claim 1, wherein the back cover further comprises a pair of outer side plates opposite to each other; the pair of outer side plates are fixedly connected to the middle frame and cover the pair of first arms.

5. The mobile terminal of claim 4, wherein the first outer frame comprises a pair of first splicing plates opposite to each other and a first side plate fixedly connected between the pair of first splicing plates; the sliding groove is defined at one end of each of the pair of first arms, and each of the pair of first splicing plates is slidable in the sliding groove; when the slider is in the retraction state, each of the pair of first splicing plates covers the sliding groove, and is spliced with each of the pair of outer side plates.

6. The mobile terminal of claim 4, wherein the middle frame further comprises a second arm connected between the pair of first arms, and a length of the second arm is less than or equal to a length of each of the pair of first arms; the second arm is arranged close to the slider, and the rotation shaft passes through the second arm;
the back cover further comprises a second outer frame; the middle frame further comprises a third arm fixedly connected between the pair of first arms, and the third arm is disposed opposite to the second arm; a length of the third arm is less than or equal to the length of the second arm; the second outer frame is detachably connected to the pair of first arms and fixedly connected to the third arm.

7. The mobile terminal of claim 6, wherein the second outer frame comprises a pair of second splicing plates opposite to each other, and a second side plate fixedly connected between the pair of second splicing plates; the pair of second splicing plates are detachably connected to the pair of first arms, and are spliced with the pair of outer side plates; the second side plate covers the third arm.

8. The mobile terminal of claim 1, wherein the slidable assembly further comprises a second cover opposite the first cover; the second cover is substantially parallel to the first cover, and the at least one functional component is fixed between the first cover and the second cover;
the second cover is slidably coupled to the slider, and a sliding direction of the second cover is substantially parallel to a normal direction of the screen.

9. The mobile terminal of claim 8, wherein the back cover comprises a back plate opposite to the screen; the driving mechanism is fixed between the screen and the back plate, and the second cover are covered by the back plate or exposed out of the back plate along with the slider;
when the second cover is exposed out of the back plate, the second cover slides to be substantially flush with the back plate.

10. The mobile terminal of claim 8, wherein the slidable assembly further comprises a locking assembly; the locking assembly comprises a first locking member fixedly connected to the first cover and a second locking member fixedly connected to the second cover; the first locking member and the second locking member exert a traction force to each other to drive the first cover and the second cover to move towards each other.

11. The mobile terminal of claim 8, wherein the mobile terminal further comprises a transmission mechanism coupled to the first cover and the driving mechanism, the transmission mechanism is configured to drive the first cover to move relative to the slider;
wherein the transmission mechanism comprises a first adapting shaft, and an axial direction of the first adapting shaft is substantially parallel to a sliding direction of the slider; the first rotation shaft is slidably coupled to the driving mechanism and rotatable when driven by the driving mechanism.

12. The mobile terminal of claim 11, wherein the transmission mechanism further comprises a second adapting shaft and a push rod; the second adapting shaft is coupled to the first adapting shaft; the second adapting shaft defines a third guiding groove on a peripheral wall of the second adapting shaft and the third guiding groove extends along a spiral curve;
a sliding block is arranged on the pushing rod and slidably coupled to the third guiding groove; the pushing rod is slidable relative to the slider along an axis direction of the second adapting shaft to drive to the first cover to slide.

13. The mobile terminal of claim 12, wherein the third guiding groove extends in a non-equidistant spiral curve.

14. The mobile terminal of claim 12, wherein the axial direction of the second adapting shaft is substantially parallel to the first cover; a first wedge block is arranged on the first cover, and a push block cooperating with the first wedge block is arranged at one end of the push rod.

15. The mobile terminal of claim 12, wherein the driving mechanism comprises a rotation shaft rotatably coupled to the back cover; a lengthwise direction of the rotation shaft is substantially parallel to a sliding direction of the slider;
a first guiding groove extending in a spiral curve is defined on an peripheral wall of the rotation shaft, and a protrusion slidably coupled to the first guiding groove is arranged on the slider; the protrusion is slidable along the first guiding groove to drive the slider to slide relative to the back cover;
a second guiding groove communicating with the first guiding groove is defined on the peripheral wall of the rotation shaft at one end of the rotation shaft that is close to the slider in a peripheral direction of the rotation shaft, and the second guiding groove has an unclosed configuration; the protrusion is slidable along the second guiding groove;
wherein the third guiding groove comprises a first section and a second section; the push rod has a first sliding speed in the first section and a second sliding speed in the second section; the second sliding speed is greater than the first sliding speed;
when the protrusion is located in the first guiding groove, the sliding block is located in the first section; when the protrusion is located in the second guiding groove, the sliding block is located in the second section.

16. The mobile terminal of claim 12, wherein the transmission mechanism further comprises:
a first bevel gear, fixedly coupled to the first adapting shaft and rotatably coupled to the second adapting shaft; and
a second bevel gear, fixedly coupled to the second adapting shaft and engaged with the first bevel gear.

17. The mobile terminal of claim 1, wherein the screen has a display area; when the slider slides to be covered by the screen, the display area at least partially covers the at least one functional component.

18. A mobile terminal, comprising:
a screen;
a back cover, covering the screen;
a middle frame, fixedly connected between the screen and the back cover;
a slider, retractable and slidable relative to the back cover in a direction substantially parallel to the screen, and movable between a first position at which the slider is covered by the screen and a second position at which the slider is exposed out of the screen;
at least one functional component, fixed to the slider;
a first cover, slidably coupled to the slider, covering the at least one functional component, and slidable along with the slider; wherein when the slider is at the first position, the first cover is covered by the screen, when the slider is at the second position, the first cover is exposed out of the screen, and substantially flush with the screen; and
a driving mechanism, fixed between the screen and the back cover, and configured to drive the slider to slide;
wherein the driving mechanism comprises a rotation shaft rotatably coupled to the back cover; a lengthwise direction of the rotation shaft is substantially parallel to a sliding direction of the slider;
a first guiding groove extending in a spiral curve is defined on an peripheral wall of the rotation shaft, and a protrusion slidably coupled to the first guiding groove is arranged on the slider, the protrusion is slidable along the first guiding groove to drive the slider to slide relative to the back cover;
a second guiding groove communicating with the first guiding groove is defined on the peripheral wall of the rotation shaft at one end of the rotation shaft that is close to slider in a peripheral direction of the rotation shaft, and the second guiding groove has an unclosed configuration; the protrusion is slidable along the second guiding groove.

19. The mobile terminal of claim 18, wherein the slidable assembly further comprises a second cover opposite the first cover; the second cover is substantially parallel to the first cover, and the at least one functional component is fixed between the first cover and the second cover;

the second cover is slidably coupled to the slider;

the back cover comprises a back plate opposite to the screen; the driving mechanism is fixed between the screen and the back plate, and the second cover are covered by the back plate or exposed out of the back plate along with the slider;

when the second cover is exposed out of the back plate, the second cover slides to be substantially flush with the back plate.

20. An electronic device, comprising:

a screen, having a display area;

a back cover, covering the screen;

a slider, retractable and slidable relative to the back cover in a direction substantially parallel to the screen, and switchable between a retraction state in which the slider is covered by the screen and an extension state in which the slider is exposed out of the screen;

at least one functional component, fixed to the slider; wherein the slider slides to be covered by the screen, the display area at least partially covers the at least one functional component;

a first cover, slidably coupled to the slider, covering the at least one functional component, and slidable along with the slider such that the first cover is covered by the screen or exposed out of the screen; wherein when the first cover is exposed out of the screen, the first cover is substantially flush with the screen; and a driving mechanism, fixed between the screen and the back cover, and configured to drive the slider to slide;

wherein the slidable assembly further comprises a second cover opposite the first cover; the second cover is substantially parallel to the first cover, and the at least one functional component is fixed between the first cover and the, second cover;

the second cover is slidably coupled to the slider, and a sliding direction of the second cover is substantially parallel to a normal direction of the screen;

the slidable assembly further comprises a locking assembly; the locking assembly comprises a first locking member fixedly connected to the first cover and a second locking member fixedly connected to the second cover, the first locking member and the second locking member exert a traction force to each other to drive the first cover and the second cover to move towards each other.

\* \* \* \* \*